United States Patent [19]

Smith

[11] Patent Number: 4,667,306

[45] Date of Patent: May 19, 1987

[54] METHOD AND APPARATUS FOR GENERATING SURFACE-FILL VECTORS

[75] Inventor: David M. Smith, Saratoga, Calif.

[73] Assignee: Ramtek Corporation, Santa Clara, Calif.

[21] Appl. No.: 545,366

[22] Filed: Oct. 25, 1983

Related U.S. Application Data

[63] Continuation-in-part of Ser. No. 515,946, Jul. 20, 1983, abandoned.

[51] Int. Cl.$^4$ .............................................. G06F 3/00
[52] U.S. Cl. .................................. 364/900; 340/726; 340/724; 340/747
[58] Field of Search ... 364/200 MS File, 900 MS File; 340/726, 731, 747, 750, 724

[56] References Cited

U.S. PATENT DOCUMENTS

| | | | |
|---|---|---|---|
| 4,246,578 | 1/1981 | Kawasaki et al. | 340/724 |
| 4,475,104 | 10/1984 | Shen | 340/747 |
| 4,491,836 | 1/1985 | Collmeyer et al. | 340/747 |
| 4,528,642 | 7/1985 | Waller | 340/731 |
| 4,538,144 | 8/1985 | Yamagami | 340/747 |
| 4,559,533 | 12/1985 | Bass et al. | 340/724 |

*Primary Examiner*—Thomas M. Heckler
*Assistant Examiner*—Daniel K. Dorsey
*Attorney, Agent, or Firm*—Limbach, Limbach & Sutton

[57] ABSTRACT

A method and apparatus for writing a vector of data into a random access memory at high speed wherein the random access memory (RAM) is partitioned into blocks of addressable storage sites and wherein storage sites within each block are individually accessible. A vector generator provides addressing and storage site enabling signals to the RAM. Boundary detectors monitor the addressing and storage site selection signals to determine whenever storage sites within a new block of storage sites are sought to be addressed. When a boundary transition is detected, a control signal is provided to the vector generator which slows the operation of the vector generator for a period of time sufficient to permit the RAM to accept a new address. For all other addresses, the vector generator is permitted to operate at a higher speed wherein access to the RAM is made by way of enabling specific storage sites within the block of storage sites being written into. The invention further providing a method and apparatus for generating surface-fill vectors, wherein a vector generator which implements the Bresenhem Algorithm is employed to generate instructions for locating points corresponding to line segments that bound the surface to be filled. The instructions are evaluated such that the X address for a given point is recorded whenever an instruction is issued which indicates a Y address change. The recorded X address are correlated to the Y coordinates over which the surface extends. The correlated X and Y addresses then define end points of surface fill vectors which can fill in the surface.

16 Claims, 16 Drawing Figures

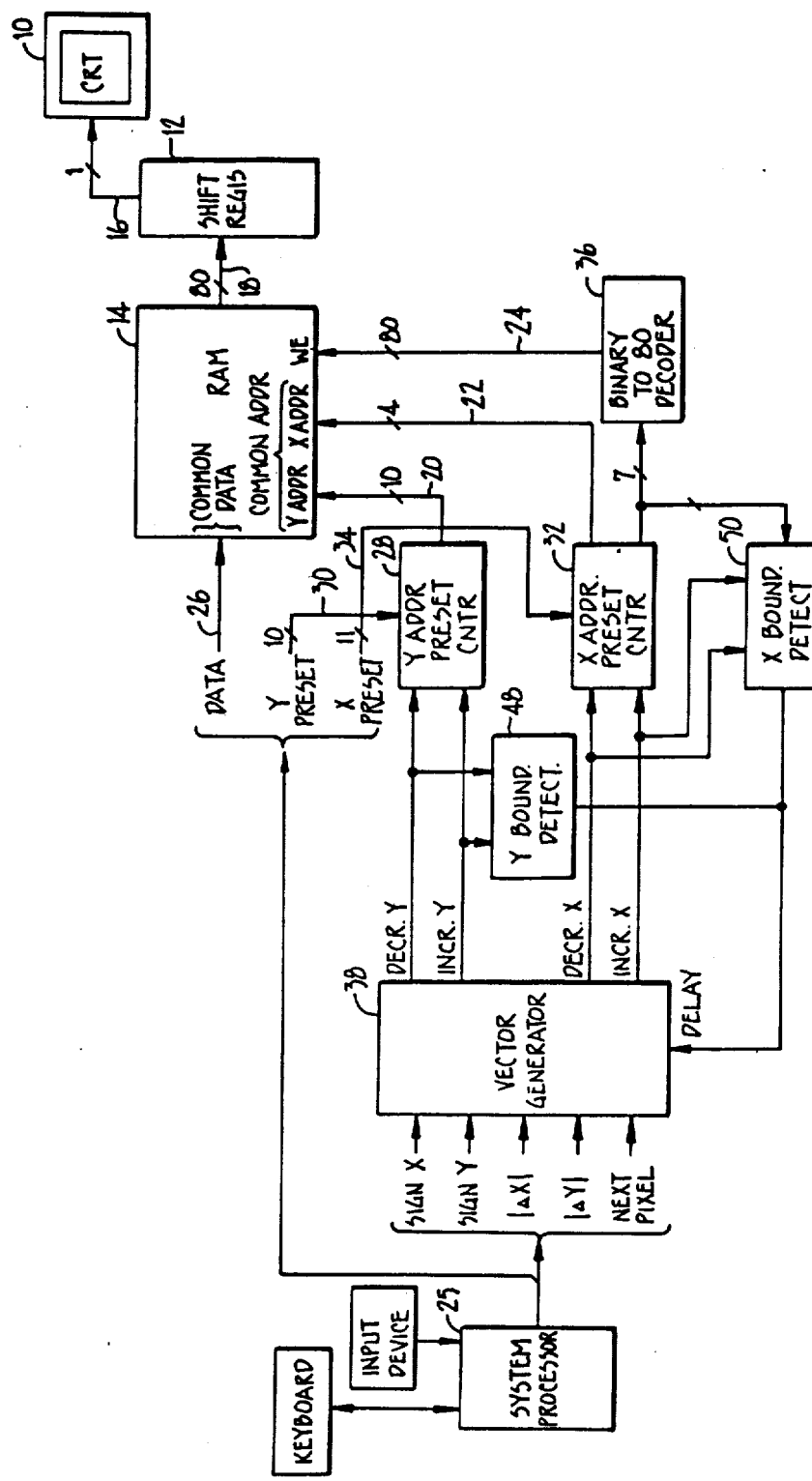
FIG._1.

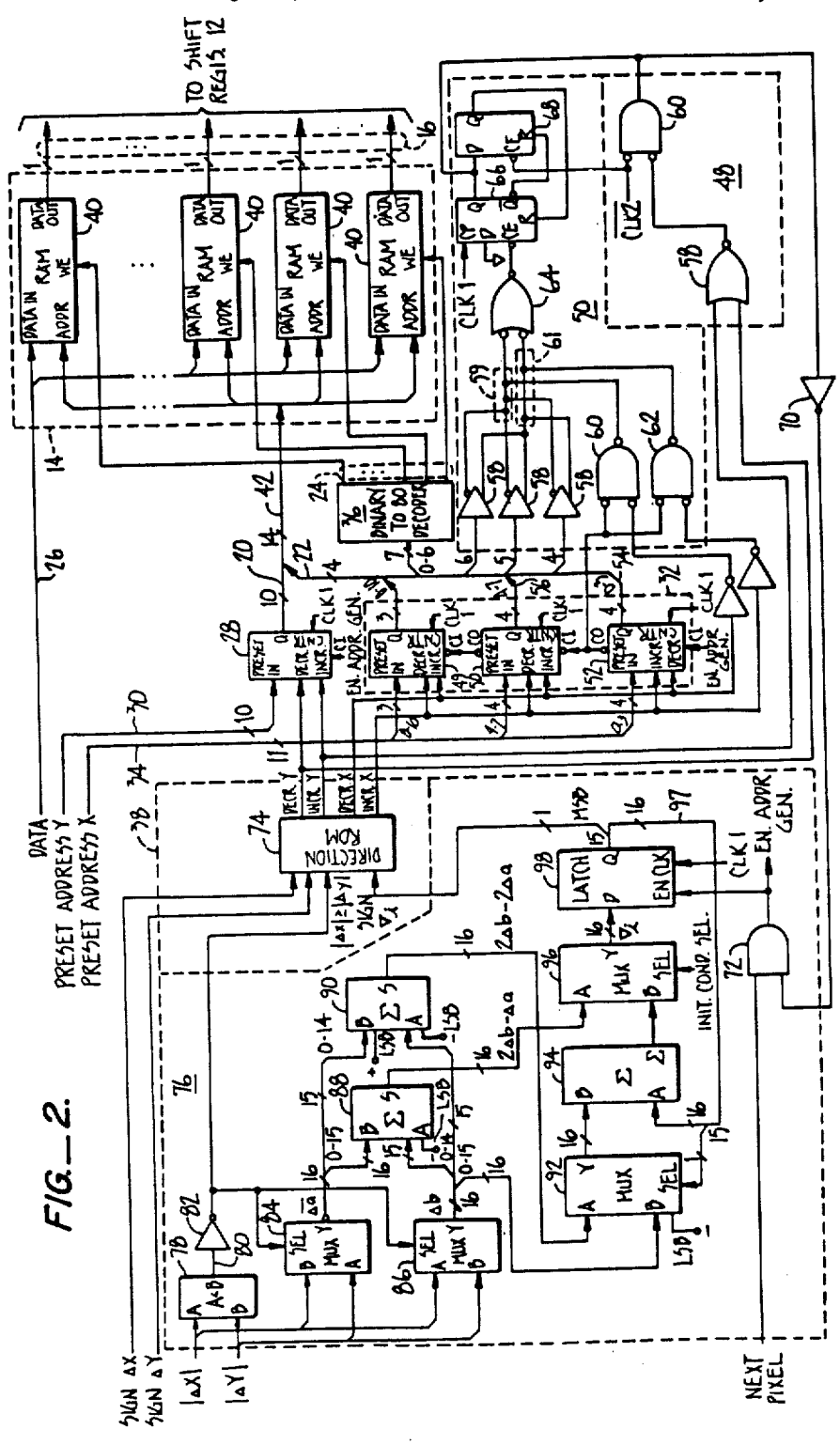
FIG._2.

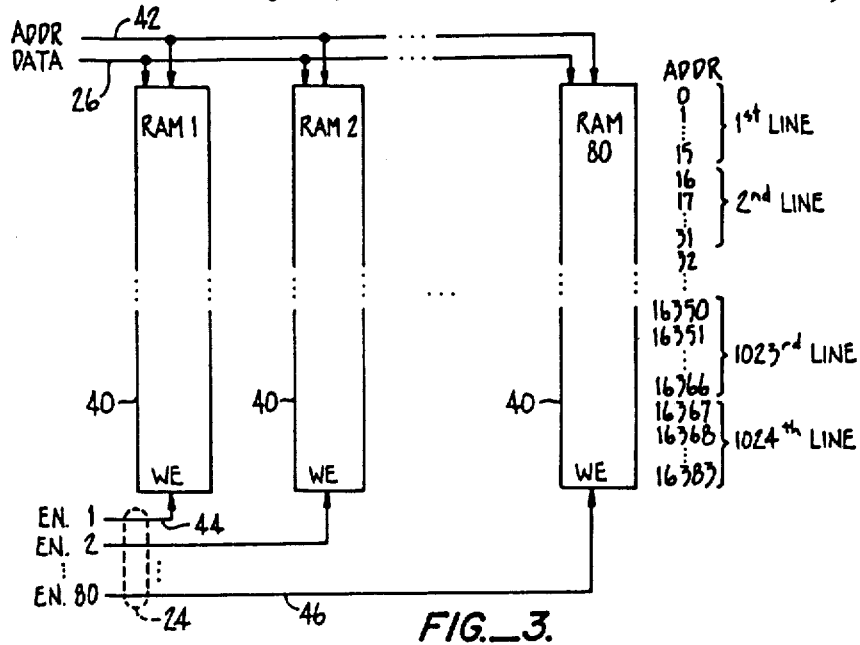
FIG._3.
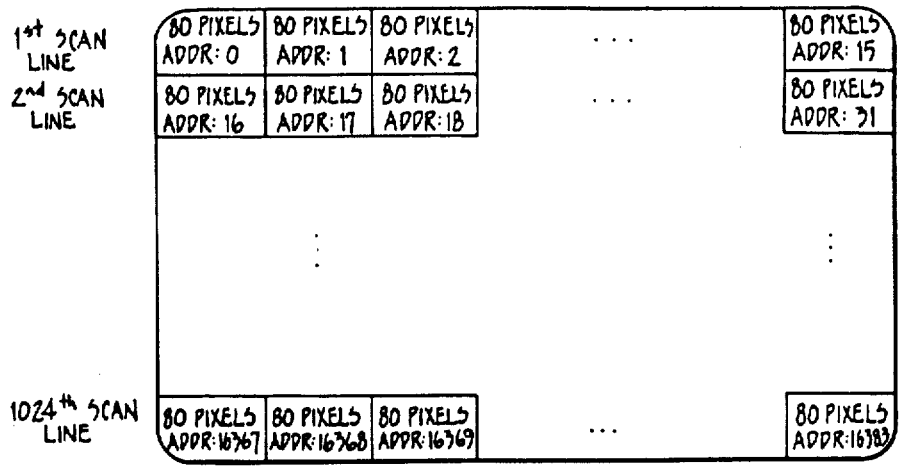
FIG._4.
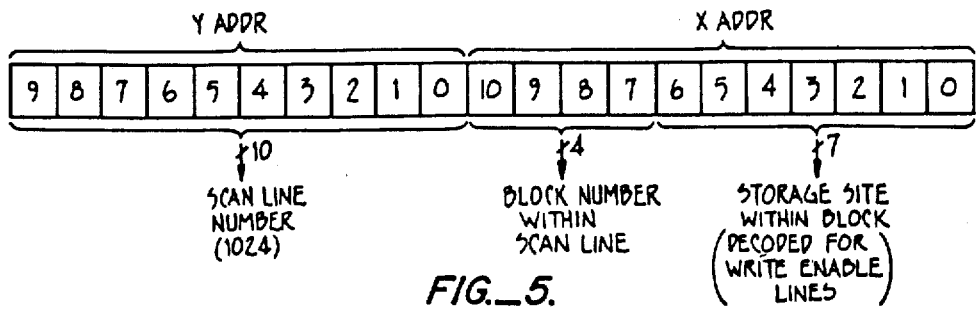
FIG._5.

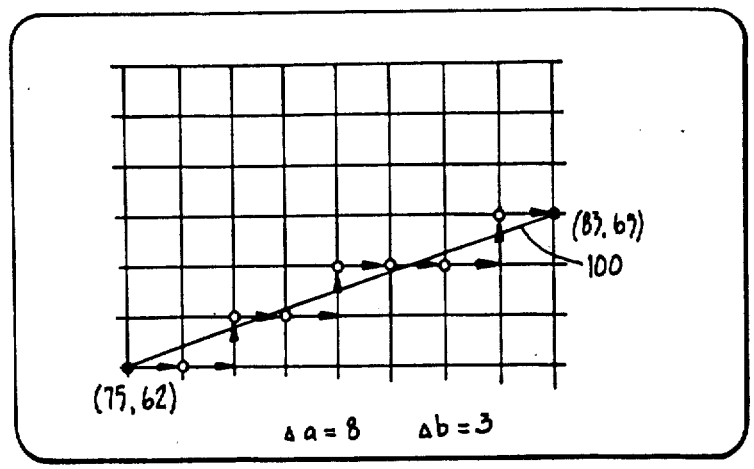
| ITERATION | $\nabla_i$ | Y: SCAN LINE ADDR<br>BIT: 9 8 7 6 5 4 3 2 1 0 | BLOCK<br>X: ADDR<br>10 9 8 7 | SITE ADDR<br>WITHIN BLOCK<br>6 5 4 3 2 1 0 | BOUNDARY DETECT | |
|---|---|---|---|---|---|---|
| | | | | | X | Y |
| | | 0 0 0 0 1 1 1 1 0 0 | 0 0 0 | 1 1 0 1 0 1 | 0 | 0 |
| 1 | -2 | 0 0 0 0 1 1 1 1 0 0 | 0 0 0 | 1 1 0 1 1 0 | 0 | 0 |
| 2 | +4 | 0 0 0 0 1 1 1 1 0 0 | 0 0 0 | 1 1 1 0 1 1 1 | 0 | 1 |
| 3 | -6 | 0 0 0 0 1 1 1 1 0 0 | 0 0 0 | 1 1 1 1 0 0 0 | 0 | 0 |
| 4 | 0 | 0 0 0 1 0 0 0 0 0 0 | 0 0 0 | 1 1 1 1 0 0 1 | 0 | 1 |
| 5 | -10 | 0 0 0 1 0 0 0 0 0 0 | 0 0 1 | 0 0 0 0 0 0 0 | 1 | 0 |
| 6 | -4 | 0 0 0 1 0 0 0 0 0 0 | 0 0 1 | 0 0 0 0 0 0 1 | 0 | 0 |
| 7 | +2 | 0 0 0 1 0 0 0 0 1 0 | 0 0 1 | 0 0 0 0 0 1 0 | 0 | 1 |
| 8 | -8 | 0 0 0 1 0 0 0 0 1 0 | 0 0 1 | 0 0 0 0 0 1 1 | 0 | 0 |
FIG._6.

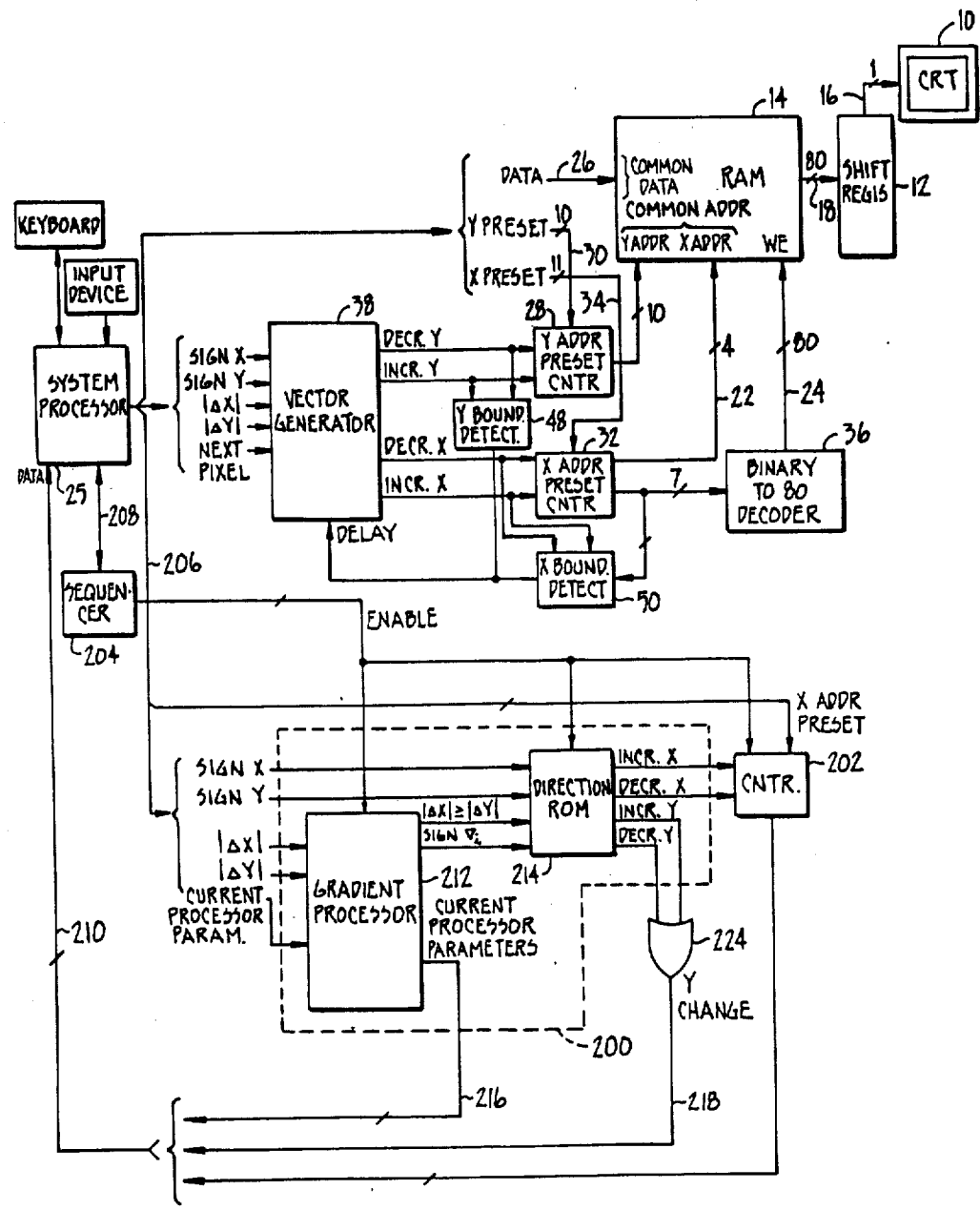
FIG._7.

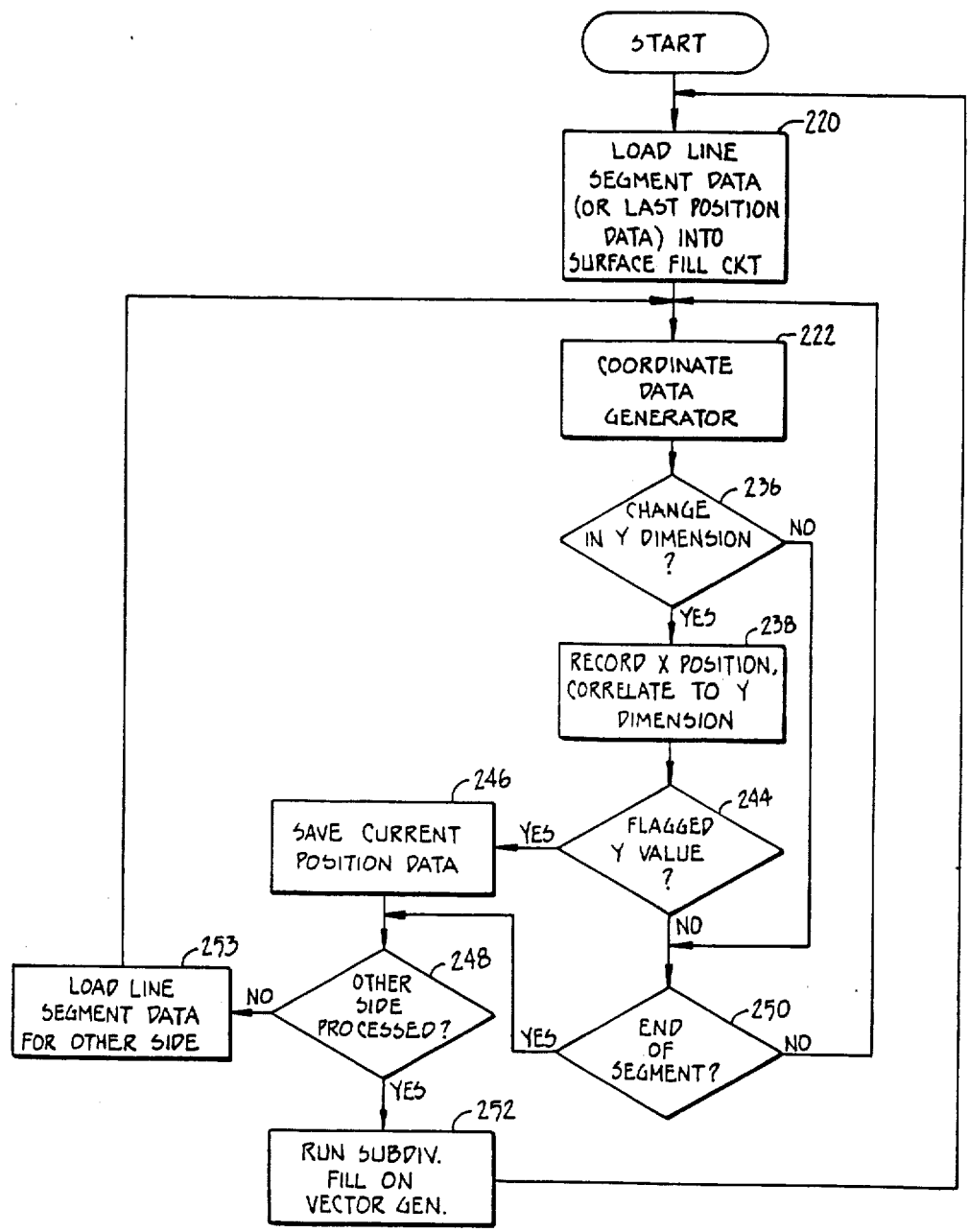
FIG._8.

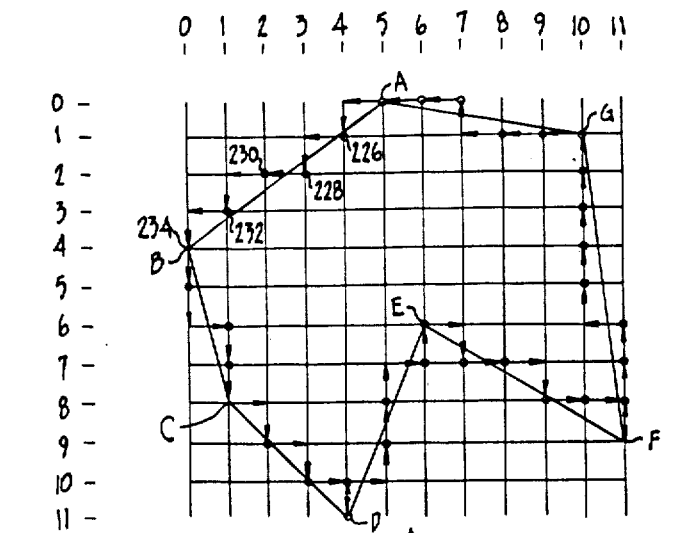
FIG._9a.
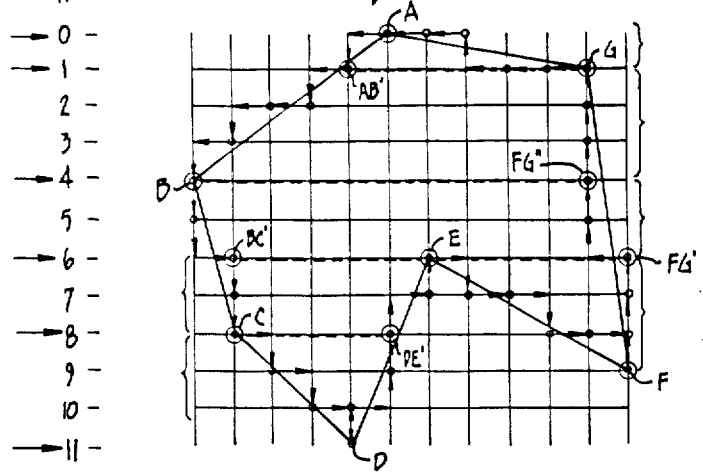
FIG._9b.
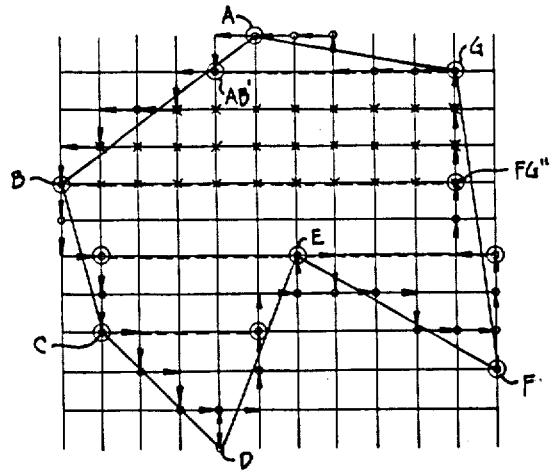
FIG._9c.

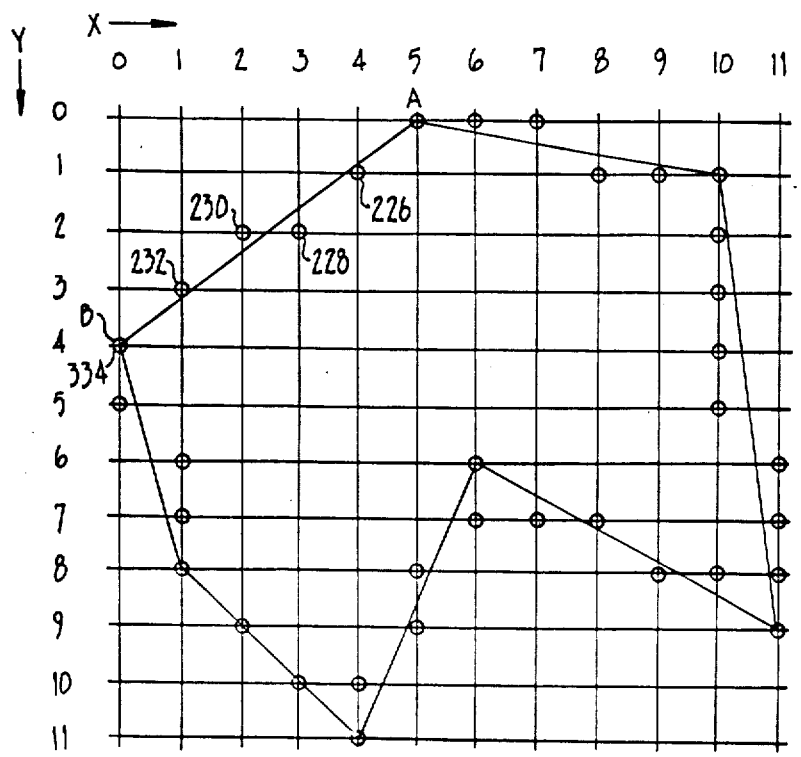
FIG._10a.
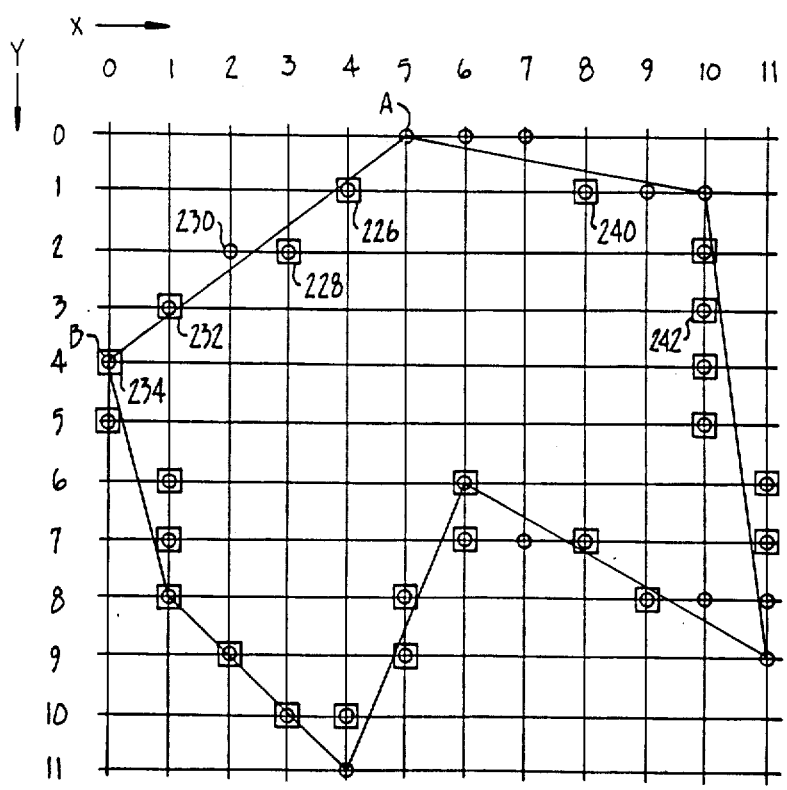
FIG._10b.

| $Y_{ADDR}$ | $X_{ADDR}$ | | | | | | |
|---|---|---|---|---|---|---|---|
| | AB | BC | CD | DE | EF | FG | GA |
| 0 | 5 | | | | | | 7 |
| 1 | (4) ←------------------------------→ | | | | | (10) | 10) |
| 2 | 3 | | | | | 10 | |
| 3 | 1 | | | | | 10 | |
| 4 | (0  0) ←-------------------→ | | | | | (10) | |
| 5 | | 0 | | | | 10 | |
| 6 | | (1) ←----→ | | (6  6) ----→ | | (11) | |
| 7 | | 1 | | 6 | 7 | 11 | |
| 8 | | 1 | 1 | 5 | 9 | 11 | |
| 9 | | | 2 | 5 | | (11   11) | |
| 10 | | | 3 | 4 | | | |
| 11 | | | (4     4) | | | | |

FIG._10c.

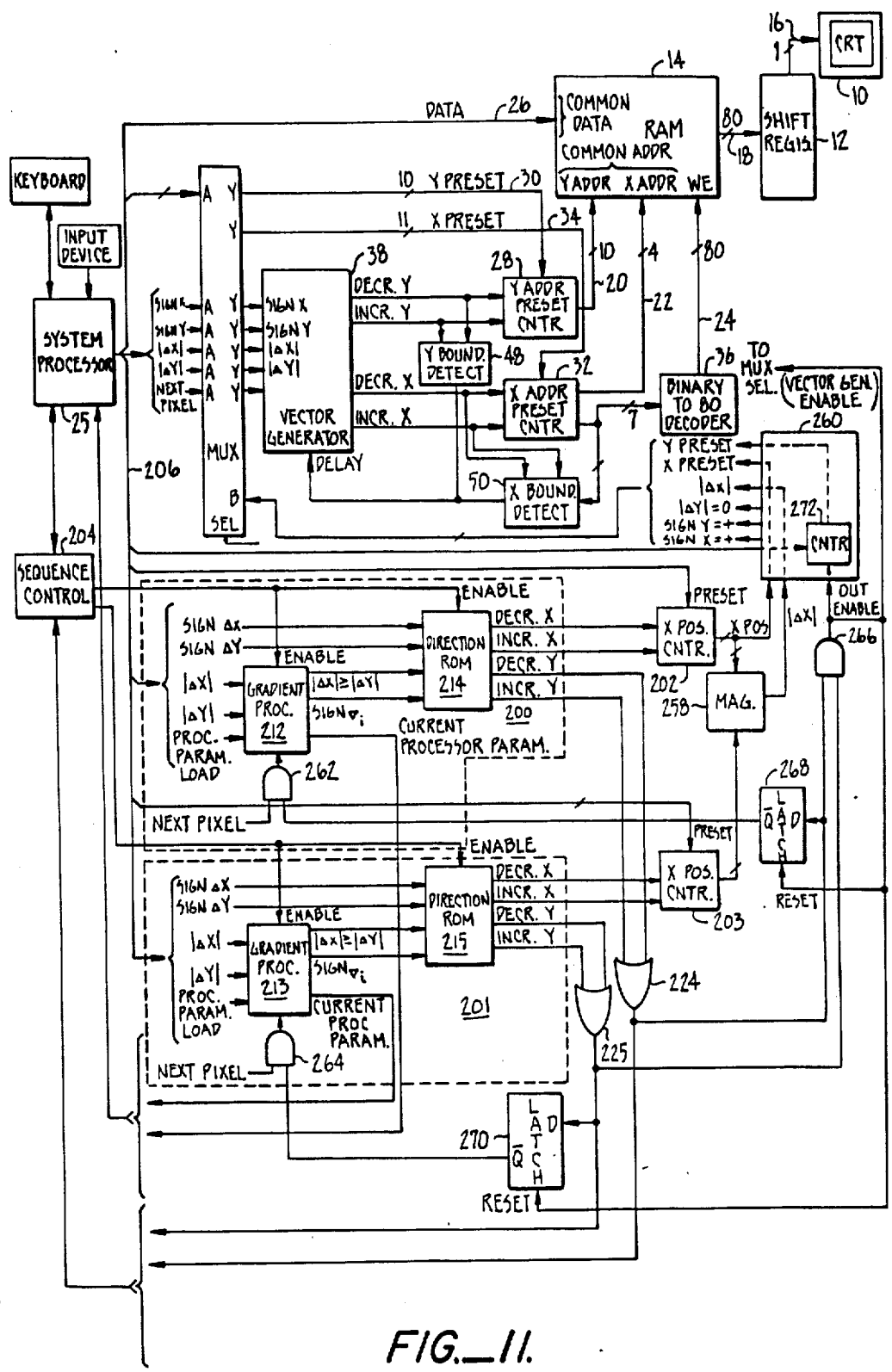
FIG._11.

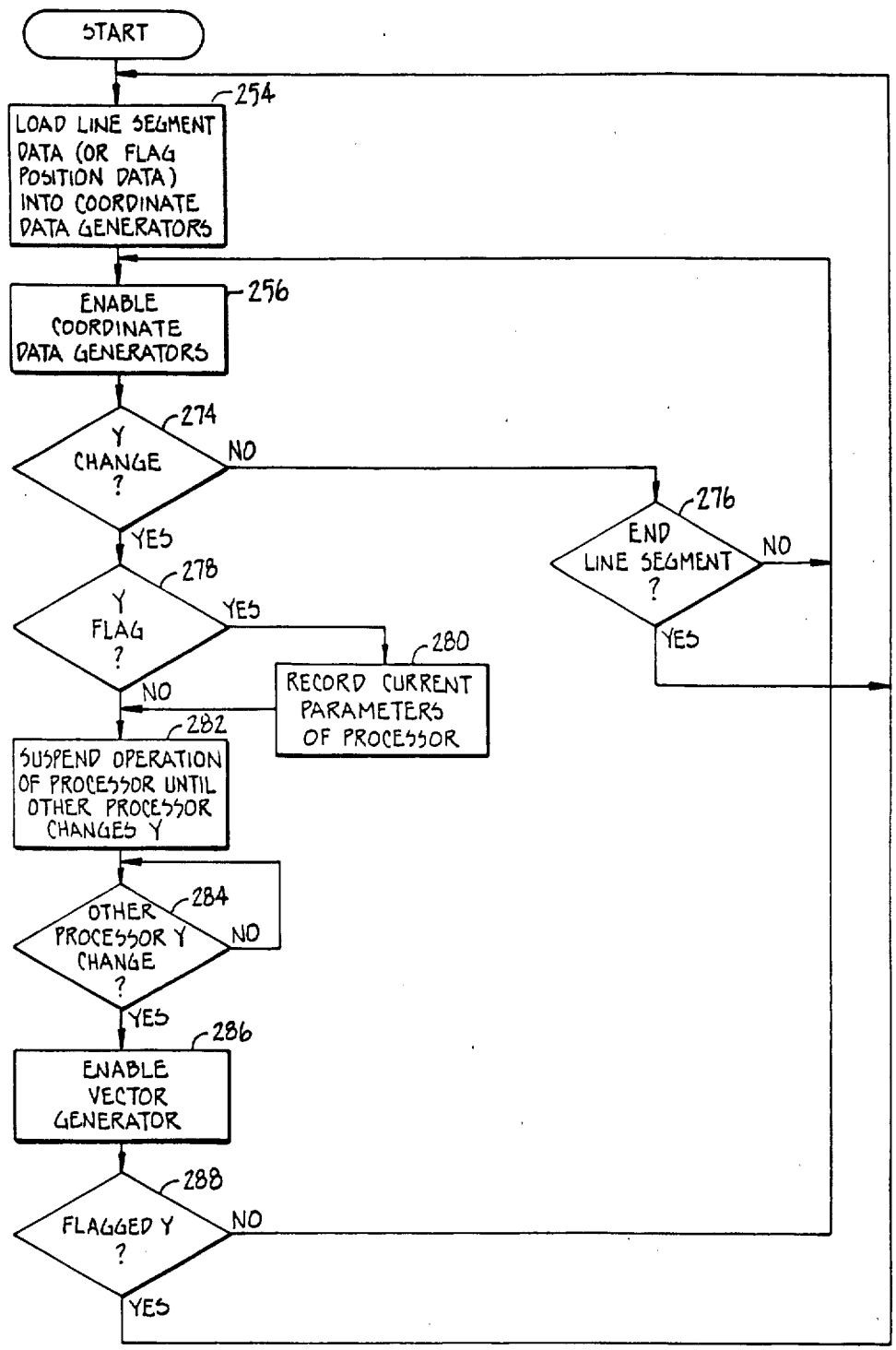
FIG._12.

METHOD AND APPARATUS FOR GENERATING SURFACE-FILL VECTORS

This is a continuation-in-part of copending U.S. patent application Ser, No. 515,946, filed July 20, 1983, now abandoned.

TECHNICAL FIELD

The present invention is, in general, directed to writing information into a random access memory and, more particularly, to a method and apparatus for writing a vector of data into a random access memory at high speed.

BACKGROUND ART

In computer graphics systems, an image is produced on a visual display screen. The information by which this visual image is generated is stored in a screen refresh random access memory on a one-to-one or pixel-to-storage site basis. That is, for each pixel of the visual image display, there is a corresponding storage site in the random access memory (RAM) which contains data corresponding to and describing the visual information of that pixel. In order to display the information from the screen refresh RAM, the data from the screen refresh RAM are periodically read out on a line-by-line basis and displayed on a line-by-line basis in the visual display of the system. Typical of these displays are raster scanning devices such as high density television monitors which have a large number of horizontially displayed scan lines.

In order to write information into the screen refresh RAM, an X and a Y address are supplied to the RAM, along with the data to be written thereby. A write enable signal is supplied to the RAM to write the data into the addressed storage site. This process must be repeated for each storage site into which data are to be written. This entails supplying a different address for each different storage site being writen into.

It is well-known that the speed at which these write operations can occur is limited by the RAM access time; i.e., the amount of time that the address and data are required to be present before the RAM can accurately respond to the information. It is also well-known that the speed by which data can be written into the RAM is limited by the speed at which the addressing of the RAM occurs.

The speed with which data can be written into a screen refresh RAM has a direct impact upon the performance of a graphics display system. For example, when extensive images are sought to be written into the screen refresh RAM, there will be a substantial time delay during which the write operation is being executed. In turn, this slows the operation of the entire system, as well as detracts from the operation of the system as a tool which assists in a design or display process.

Another common but time-consuming operation involves the filling-in of surfaces of the image being displayed so as to provide an appearance of solidness or shading, or the like. In the past, this surface-fill or polygon-fill operation was accomplished: (1) by defining a number of line segments which bound the surface to be filled, (2) by deriving first order equations which were descriptive of each of the line segments, the equations being in the form of $Y = mX + b$, where Y and X are coordinate values, m is the slope of the line segment, and b is the offset of the line segment from a reference point, (3) by obtaining the value of X for specific values of Y, and (4) by using the values of X obtained for each Y coordinate as end points for horizontal line segments. The end points would then be supplied to a vector generator, which, in turn, would write the corresponding horizontal line segments to fill-in the surface bounded by the previously defined line segments.

The above-described approach has several disadvantages. First, the calculations required are timeconsuming and involve both additive and multiplicative operations. Secondly, it can be shown that the values obtained from evaluating the above-identified equation are often in non-integer form. For example, for a line having a slope of minus 4/5, and an offset of 4, values for X will be 5, 15/4, 5/2, 5/4 and 0, for Y values of 0, 1, 2, 3, and 4, respectively. Thus, in order to be usable in a digital graphics system which forms images from discrete points, the X values are required to be rounded to integer numbers. This results in inconsistencies in the manner in which the end points of the horizontal vectors are defined and, thus, the manner in which the surfaces are filled in.

SUMMARY OF THE INVENTION

The foregoing problems of previous apparatus for writing data into a screen refresh RAM are overcome by the present invention of a method and apparatus for writing data into a screen refresh RAM at high speed, including a random access memory having a plurality of storage sites wherein the storage sites are addressable in blocks at a memory access rate. The storage sites within an accessed addressable block can be individually enabled at a write enable rate to receive data. An address generator provides the addressing for each block which is to be written into and the enable signal for the particular storage site within the accessed addressable block which is to receive the data. The rate of operation of the address generator is selectable between the memory access rate and the write enable rate. A control means is coupled to the address generator for selecting the rate of operation of the address generator according to the nature of the addresses being supplied by the address generator. Whenever addresses are supplied by the address generator for accessing a new addressable block, the control means cause the address generator to operate at the memory access rate for a predetermined period of time. After the predetermined period of time, the control means cause the address generator to resume operation at the write enable rate.

With the present invention the screen RAM is required to be addressed less frequently than the screen refresh RAM apparatus of the prior art. As used herein, a RAM access entails the application of an address on the RAM address lines, the receipt of or output of data on the RAM data lines, and the application of a write or a read enable signal on the RAM enable line. The RAM enable operation entails the application of the write or read enable signal to the RAM, it being assumed that the address and input data remain unchanged. Typically, the period of time required for a RAM access, such as a write operation, is longer than the period of time required for the RAM to be enabled, such as a write enable. Thus, with the above structure, a large proportion of the writing into or reading out of the storage sites in the RAM can be accomplished by enabling the appropriate storage site in the RAM. The number of storage sites within each block affect how frequently a RAM access operation will be required. Since the write enable signal is typically shorter than the RAM access time period, data can be written into the RAM at a higher speed for storage sites within a block. Thus, when the system is writing information within a block, the vector generator can operate at a speed which is comparable to the write enable speed requirement. When the storage site to be written into crosses a boundary between blocks or lies within a new block, the control means causes the address generator to slow down for a time period which satisfies the RAM access timing requirements. Thereafter, the control means permits the address generator to resume operation at the higher rate.

In order to implement the organization of storage sites into blocks in the preferred embodiment, a plurality of random access memories are addressed in common and receive data in common; however, each random access memory is supplied individually with a write enable signal. Thus, for a particular address, the corresponding storage site in each RAM for all of the RAMs collectively represent the block of storage sites corresponding to the address. When a write enable signal is supplied to a particular RAM, the data present on the data lines are written into that enabled RAM only, and only at the applied address.

In the preferred embodiment, the control means are implemented by circuitry which monitors the Y address for any changes therein, and the X address for any addresses which correspond to the end points of a block of storage sites. Upon the occurrence of either a change in the Y address or the addressing of an end point of a block, the circuitry supplies a delay signal or an inhibit signal to the address generator.

The present invention provides a surface-fill capability through a modified use of coordinate data generating means, such as a vector generator. Coordinate data generating means are provided which are responsive to line segment data, which data specify line segments that bound the surface to be filled. The coordinate data generating means are of the type which provide increment/decrement instructions by which points, collectively forming the particular line segment, can be located on the visual display. The location of each such point is designated by a set of addresses, with each address of the set representing a physical position along a dimension of the visual display. Means are provided which generate the address of each such point along a first dimension of the visual display in accordance with the increment/decrement instructions. Means are provided for evaluating the increment/decrement instructions which correspond to addresses from the address set along a second dimension of the visual display.

When either a decrement or increment instruction for addresses in the second dimension is received, the monitoring means correlate the address being generated for the first dimension to the second dimension address. The second dimension address being that which results from the corresponding increment/decrement instruction being received for the second dimension. The monitoring means form a table which includes the locations of points of the line segment being evaluated, where each point is at a different second dimension location or address in relation to the other points. When all of the line segments which bound the surface have been evaluated in the above manner, the table being maintained by the monitoring means contains end points for a plurality of parallel lines which, when written into the visual display, will collectively fill the surface.

As will be described in greater detail at a later point in this specification, there are a number of ways in which the speed of the above operation can be enhanced. In one embodiment of the present invention, the end points of all of the line segments which bound the surface are evaluated, and utilized to generate a set of flags correlated to the second dimension coordinate of each of the end points. These flags are then utilized in controlling the operation of the coordinate data generating means so that the surface is effectively divided into a number of subdivisions, with each subdivision being separately filled-in, in sequence. Thus, when the coordinate data generating means has completed evaluation of the line segments which bound one of the subdivisions, an instruction can be provided to the system to proceed with writing in the parallel line segments defined in the surface fill table. Thereafter, the coordinate data generating means can proceed with evaluating the next subdivision and forming the surface fill table therefor.

In another embodiment, a plurality of coordinate data generating means are provided so that several of the line segments bounding a particular subdivision can be evaluated simultaneously to generate the corresponding surface fill table more quickly. Although this latter alternative embodiment involves more hardware, the improvement in speed of a surface fill operation can be substantial.

It is, therefore, an object of the present invention to provide a method and apparatus for writing data into a screen refresh RAM at high speed, wherein the screen refresh RAM includes storage sites which are accessable in addressable blocks, and wherein storage sites in an addressable block are individually enabled, and wherein addresses and write enable signals are supplied to the screen refresh RAM at a rate corresponding to the write enable rate of the screen refresh RAM, and further wherein circuitry is provided which slows the operation of the address generator for a predetermined period of time whenever a storage site within a different addressable block is being accessed.

It is another object of the present invention to provide a method and apparatus for writing data into a screen refresh RAM at high speed wherein storage sites within the refresh RAM are arranged in addressable blocks, and storage sites within an accessed addressable block can be enabled individually, and further wherein data are written into storage sites located within a given block at a rate corresponding to the write enable rate of the screen refresh RAM by operating an address generator at the write enable rate, and further wherein the operation of the address generator is slowed to the memory access rate of the screen refresh RAM whenever the next storage site to be written into is located in a different block of storage sites.

It is a further object of the present invention to provide an apparatus for generating surface fill information wherein means are provided for evaluating the line segments which bound the surface to be filled in, which means provide instructions by which points can be located on the visual display and which points collectively form the line segment being evaluated, and further wherein means are provided for evaluating the instructions from the generating means to form a surface fill table, which table includes the end points for a plurality of parallel lines which collectively can fill in the surface.

These and other objectives, features and advantages of the present invention will be more readily understood upon consideration of the following detailed description of the present invention, taken in conjunction with the accompanying drawings.

DESCRIPTION OF THE DRAWINGS

FIG. 1 is a simplified functional block diagram of the present invention.

FIG. 2 is a more detailed functional block diagram of the present invention.

FIG. 3 illustrates the arrangement of storage sites in the screen refresh RAM.

FIG. 4 illustrates the correspondence of the blocks of storage sites to pixel locations on the visual display of a video-graphics system.

FIG. 5 illustrates the allocation of address information between a Y address, an X address and the allocation of the X address between a block address and write enable information.

FIG. 6 is an example of the operation of the present invention.

FIG. 7 is a functional block diagram which illustrates the surface fill elements of the present invention and their relationship to the vector generation portion of a computer graphics system.

FIG. 8 is a simplified flow diagram of the operation of the surface fill function of the present invention.

FIGS. 9a through 9c illustrate the steps involved in the evaluation of line segments and the formation of a surface fill table.

FIGS. 10a and 10b are a further illustration of the formation of the surface fill table.

FIG. 10c shows the surface fill table for the subdivision.

FIG. 11 is a functional block diagram of an alternate embodiment of the present invention.

FIG. 12 is a simplied flow diagram of the operation of the alternative embodiment of FIG. 11.

DETAILED DESCRIPTION OF THE INVENTION

Referring to FIG. 1, a visual display apparatus 10, such as a cathode ray tube, receives and displays information from a shift register 12 and screen refresh RAM 14 via line 16 and line 18. In the visual display shown, a resolution of 1,280×1024 pixels is provided, and a pixel is displayed at a rate of one pixel per ten nanoseconds. In the embodiment shown, shift register 12 receives 80 pieces of information from screen refresh RAM 14, in parallel, once every 800 nanoseconds. Shift register 12 thereafter shifts this information to visual display 10 via line 16 in a serial manner at a rate of one item of information per 10 nanoseconds. The addressing by which this transfer of information is controlled is generated by screen refresh RAM read circuitry, which is a part of the system processor 25.

It is to be understood that, in the typical video graphics system, each pixel of the video display 10 can have a number of different attributes. In order to specify these attributes, the data supplied to the visual display means 10 for each pixel includes a number of bits, i.e., a word of information. In order to provide these words of information, several planes of screen refresh RAM will be provided with corresponding shift registers, wherein each plane provides one bit of information for the word corresponding to a particular pixel. For purposes of simplifying the explanation of the present invention, only a single plane of screen refresh RAM will be discussed, it being understood that the discussion is equally applicable to multiple planes of screen refresh RAM.

In order to write information into screen refresh RAM 14, a Y address is supplied on line 20, an X address is supplied on line 22, and write enable signals are supplied on line 24. Data are supplied to screen refresh RAM 14 from the system processor 25 via line 26.

The Y address is supplied to line 20 by a Y address preset counter 28. The system processor 25 provides the preset information to Y address preset counter 28 via line 30.

The X address and information for the write enable signals are generated by X address preset counter 32. The preset X address is supplied from the system processor 25 via line 34. A portion of the X address generated by X address preset counter 32 is supplied to line 22 as the X address to screen refresh RAM 14, while the remainder of the address is provided to a binary-to-80 decoder 36. Binary-to-80 decoder decodes the address information from X address preset counter 32 to provide a signal on one of 80 lines which are collectively referenced as line 24. Y address preset counter 28 and X address preset counter 32 are incremented or decremented by commands from vector generator 38.

Vector generator 38 receives information from the system processor by which it generates the decrement and increment control signals to the Y address preset counter and the X address preset counter, and by which vectors of data can be written into screen refresh RAM 14. Typically, the system processor supplies the vector generator 38 with the following information: (1) the magnitude of the change in the X direction, (2) the magnitude of change in the Y direction, (3) the direction of change in the X direction, i.e., the sign of X, (4) the direction of change in the Y direction, i.e., the sign of Y, and (5) a command to generate the address for the next pixel of data.

From this information, the vector generator determines the optimal sequence of pixel addresses by which the vector can be generated, from the given starting point to an end point which is displaced from the starting point by the X and Y displacements specified, and in the directions specified. The Y preset and X preset information supplied to the Y address and X address preset counters 28 and 32, respectively, provide the starting point for the vector being generated. Therefore, the end point of the vector being generated is defined by the displacement and direction information from the system processor.

It is to be understood that there are numerous versions of vector generators in the prior art, and that any of these vector generators are suitable for use in the present invention so long as the vector generator is capable of providing addresses at a rate comparable to the write enable rate of the screen refresh RAM 14, and so long as the operation of the vector generator can be modified for a predetermined period of time to a lower rate of operation comparable to the access time for the screen refresh RAM 14. It is also to be understood that a vector generator which is suitable for use in the present invention can also be of the type which receives starting point and end point information and converts such information into addressing control signals.

A Y boundary detector 48 monitors the decrement Y and increment Y commands from vector generator 38 to Y address preset counter 28. Whenever a signal is detected on either line, Y boundary detector 48 provides a signal to the delay input of vector generator 38, which causes vector generator 38 to operate at the rate which corresponds to the access rate of the screen refresh RAM 14.

Similarly, X boundary detector 50 monitors certain of the lines from X address preset counter 32. The lines monitored specify the storage site within the block of storage sites being currently addressed. X boundary detector 50 also monitors the decrement X and increment X commands from vector generator 38 to X address preset counter 32. By doing so, the X boundary detector 50 can determine whether the storage sites being subsequently addressed will fall within a different block of storage sites. In other words, if the storage site currently being addressed is at one end of the block of storage sites, and if the command from vector generator 38 is to increment or decrement the address so that the next address will fall outside of the block being currently addressed, the X boundary detector 50 will provide a delay signal to the delay input of vector generator 38.

In the above manner, a feedback vector generator structure is provided by which the feedback generator can "look ahead" to determine whenever storage sites outside of the block currently being addressed will subsequently be addressed.

Screen Refresh RAM 14

Referring to FIGS. 2 and 3, the configuration of the screen refresh RAM 14 will now be discussed in greater detail. In FIG. 2, it can be seen that the screen refresh RAM 14 comprises a plurality of RAMs 40. Each of these RAMs 40 receives, in common, the data from line 26 and addresses on line 42, it being understood that line 42 is comprised of Y address bus 20 and X address bus 22. Each of the RAMs 40 receives a write enable signal from separate write enable lines 24. Each of the RAMs 40 output data on separate lines 16. In the preferred embodiment of the present invention, there are 80 such RAMs 40, and each of the RAMs is a 16K × 1 static RAM. These static RAMs are commercially available, such as part number IMS-1400 manufactured by Inmos, Inc. of Colorado Springs, Co.

FIG. 3 illustrates the organization of the storage sites in the plurality of RAMs 40 which is provided by the structure shown in FIG. 2. With 80 RAMs of 16K × 1 storage sites, each address supplied to RAM 14 addresses a block of 80 storage sites. For example, for address 1, the storage site corresponding to address 1 in each of the 80 RAMs will be accessed; for address 16383, the storage site in each RAM corresponding to address 16383 will be accessed. Thus, the structure shown in FIGS. 2 and 3 provide 16,384 blocks of storage sites, with each block containing 80 storage sites.

Data can be written into a particular storage site within an addressed block by providing the appropriate write enable signal on the corresponding write enable line for the RAM within which the site is located. Thus, if the first storage site in the block corresponding to address 15 were desired to be written into, a write enable signal would be supplied to the enable 1 line, line 44, which controls RAM 1. So long as a write enable signal is not applied to any of the remaining RAMs 40, the data on data bus 26 will only be written into the RAM 1 storage site corresponding to address 15. Similarly, if data were desired to be written into storage site 80 of the block corresponding to address 15, an appropriate signal would be supplied to enable 80 line, line 46, which controls RAM 80.

FIG. 4 shows the correspondence of the blocks of addressed storage sites to the physical portions of visual display 10. In the preferred embodiment of the present invention, the visual display provides 1280 pixels in the horizontal direction and 1024 pixels in the vertical direction. Thus, for each line of pixels, referred to herein as a scan line, there will be 16 blocks of 80 pixels each. FIG. 4 illustrates the positioning of these blocks with corresponding addresses.

Address Generation

Referring to FIG. 2 and FIG. 5, the generation and allocation of the addressing for screen refresh RAM 14 will now be discussed in greater detail. FIG. 5 shows a 21 bit address which is supplied collectively from Y address preset counter 28 and X address preset counter 28. Y address preset counter 28 supplies the ten most significant bits of the collective address while X address preset counter 32 provides the remaining eleven bits of the collective address. The ten most significant bits of the collective address specify the scan line within which the storage site sought to be addressed is located. It can be seen that ten bits of binary address can accomodate the 1024 scan lines which are to be addressed.

In the X address portion of the collective address, the four most significant bits thereof designate the block address within the scan line specified by above-mentioned Y address. Because, for the preferred embodiment of the present invention, there are 16 blocks of storage sites for each scan line, four bits of the X address are allocated to the block-addressing function. The remaining seven bits of the X address portion are allocated to designate individual storage sites within the addressed block. Therefore, in the preferred embodiment to the present invention, seven bits of address are allocated to address the 80 storage sites within a block.

FIG. 2 illustrates the embodiment of the X and Y preset address counters 28 and 32, respecitvely. Y address preset counter 28 can be implemented using binary counters such as part number 10136 manufactured by Motorola, Inc. of Phoenix, Ariz. The starting point of the vector to be generated, i.e., the scan line containing the storage site which corresponds to the starting point of the vector, is preset into Y address preset counter 28 via line 30. Depending upon the commands received from vector generator 38, Y address preset counter 28 will increment or decrement the preset Y address at a rate determined by clock signal CLK1 supplied to the clock input thereof.

X address preset counter 32 can be implemented using a combination of binary preset counters, such as part number 10136, referred to above, and decade counter part number 10137, manufactured by Motorola, Inc. of Phoenix, Ariz. As shown in FIG. 2, preset counters 49 and 50 are binary counters, while preset counter 52 is a decade counter. Preset counter 49 receives the three most significant bits of the preset address X supplied on line 34, while preset counter 50 receives the next four most significant bits. Preset decade counter 52 receives the four least significant bits of preset address X supplied on line 34. Each of preset counters 49, 50 and 52 increment or decrement their count at a rate determined by clock CLK1. Preset counter 52 is enabled by an enable signal supplied to its CI input. Preset counter 52 counts from zero to ten, in binary, and upon reaching a count of 10, provides a carry signal at its CO output. The output count is supplied from the Q output of the preset counter 52 on line 54. The carry output from preset counter 52 is applied to the CI input of preset counter 50. Thus, each time preset counter 52 reaches a count of 10, preset counter 50 will be enabled to count for a period corresponding to the duration of the carry signal from preset counter 52.

Preset counter 50 is a full binary counter which counts from 0 to 16 in binary, the actual count is supplied from the Q output thereof, on line 56. When a count of 16 is reached, preset counter 50 supplies a carry signal at its CO output. This signal is applied to the CI input of preset counter 49. Thus, preset counter 49 is enabled to count for a time period corresponding to the carry output from preset counter 50.

The above configuration provides, for the seven least significant bits of the generated address, a form of binary-coded decimal address.

It is to be understood that the above binary-coded decimal addressing is provided so that the 80 storage sites within each block of storage sites can be designated by the address being generated. It is to be understood that the form of addressing for the least significant bits of the address from X preset counter 32 will vary depending upon the number of storage sites within a block of storage sites. Thus, if a block contains 64 storage sites, a full binary format and a pair of 16-bit binary counters can be utilized.

The six least significant bits from X address preset counter 32 are supplied to BCD-to-80 decoder 36. From the BCD address information, decoder 36 selects one of its 80 output lines to enable the RAM 40 which contains the storage site specified in the BCD address data. It is to be understood that if the arrangement of screen refresh RAM 14 permits the use of pure binary addressing of the storage sites within an addressed block decoder 36 would be a binary-to-N decoder, where N corresponds to the number of storage sites within a block.

Boundary Detection

As discussed above, in connection with FIG. 1, a Y boundary detection circuit 48 and an X boundary detection circuit 50 are provided to permit a look-ahead function. The Y boundary detector 48 is shown in the bottom righthand corner of FIG. 2. The Y boundary detector 48 monitors the decrement Y or increment Y control signals from vector generator 38. Because, as discussed above, the Y address portion of the collective address supplied to screen refresh RAM 14 specifies the scan line containing the storage site into which the data are to be written, any change in the Y address count can be interpreted as a movement from one block of storage sites to another block of storage sites, hence requiring a RAM access.

The inputs of NOR gate 58 are connected to the decrement Y and increment Y lines from vector generator 38. Whenever a command signal is present on these lines, NOR gate 58 will supply a logic zero signal to AND gate 60. The other input to AND gate 60 is supplied from a second clock $\overline{CLK2}$. Typically, the $\overline{CLK2}$ signal will have a repetition rate which is comparable to the access rate for screen RAM 14.

As discussed above, the present invention exploits the shorter time period typically required for the write enable signal into a random access memory. Recall that, during a write operation, data, an address and a write enable signal are required to be supplied to the random access memory. The typical requirement is that the address and data be applied to the random access memory for a predetermined length of time before a valid write operation can be accomplished. This predetermined length of time permits the signals on the data and address lines to settle into a steady state condition as well as permits the random access memory itself to respond to the information on the data and address lines. Thereafter, the write enable signal is applied which has a shorter duration than the time period required for the address and data. Thus, by requiring that address signals be changed only periodically, and by controlling the actual writing of data into the random access memory by appropriate application of write enable signals to appropriate write enable lines of the random access memory, a larger proportion of the write operation will involve use of the write enable signal, as opposed to the longer RAM access time period.

The vector generator 38 will thus operate more often at the higher speed write enable rate, and will slow its operation only when a new block of storage sites is to be addressed.

As discussed above, the X and Y boundary detection circuits 48 and 50, respectively, detect the condition wherein a new block of storage sites is to be addressed. In FIG. 2, X boundary detection circuitry 50 is shown to receive information from the decrement X and increment X lines of vector generator 38, bits 4 through 6 from X address preset counter 32, and the carry output from decade preset counter 52.

As discussed above, decade preset counter 52 provides a carry signal at its output whenever its count is incremented to a count of 10, or decremented to a count of 0. Bits 4 through 6 from the X address preset counter 32 correspond to the tens place of the binary coded decimal address which is supplied to BCD to 80 decoder 36. These bits are received by buffers 58 which, in turn, provide an inverted and a noninverted output representative of the state of the applied bits.

In the embodiment of the invention shown in FIG. 2, emitter coupled logic circuitry is utilized. As such, the outputs of buffers 58 can be tied together as shown in FIG. 2 to form "wired ORs". As can be seen from the figure, the inverted outputs from buffers 58 are tied together and the noninverted outputs of buffers 58 are tied together. Also forming a part of the "wired OR" 59 of the inverted outputs from buffers 58 is the output from inverted input NAND gate 60. Inverted input NAND gate 60 receives, as one of its inputs, the carry signal from preset counter 52. The other input to NAND gate 60 is supplied from the decrement X signal originating from vector generator 38.

Also forming a part of the "wired OR" 61 of the noninverted outputs of buffers 58 is the output from inverted input NAND gate 62. One input to NAND gate 62 is supplied from the carry output of preset counter 52, while the other input is supplied from the increment X line, originating from vector generator 38. The "wired OR" 59 is connected to one input of inverted input NOR gate 64. The other input of NOR gate 64 is supplied from the "wired OR" 61.

Whenever bits 4 through 6 of the output of X address preset counter 32 are all in a logic one state, and there is a carry signal from preset counter 52, and there is an increment X signal from vector generator 38, the "wired OR" 59 provides a zero logic level to NOR gate 64. In turn, NOR gate 64 provides a logic zero level to the CE or chip enable input of D flipflop 66. The output of D flipflop 66 assumes a logic one state in synchronism with the CLK1 signal applied to the CP input to D flipflop 66. The output of D flipflop 66 can be seen to be connected to the D input of flipflop 68, as well as to the vector generator 38 via inverter 70. Note also that the output from Y boundary detector circuitry 48 is connected in a "wired OR" configuration to the output of X boundary detection circuit 50.

The output of inverter 70 is received by NAND gate 72. The other input to NAND gate 72 is the "next pixel" signal from the system processor. Typically, when the vector generator function is operable, the "next pixel" signal will be in a logic one condition. When the logic zero level is received by AND gate 72 from inverter 70, a logic zero level will be applied to the enable port of vector generator 38, as well as to the enable inputs of Y address preset counter 28 and X address preset counter 32. This halts the operation of the vector generator and the preset counters 28 and 32. When the logic zero level from inverter 70 is removed, the operation of vector generator 38 and the preset counters 28 and 32 are permitted to resume.

In FIG. 2, the chip enable input to D flipflop 68 is shown connected to the $\overline{CLK2}$ signal. As discussed, the CLK2 signal has a period which corresponds to the required RAM access time period. When the $\overline{CLK2}$ period is over, as evidenced by a falling edge, for example, D flipflop 68 will receive at its D input the logic one state output then being provided by D flipflop 66. Upon receiving this logic one state, D flipflop 68 will provide at its output a logic one signal. This logic one signal, in turn, is supplied to the reset input of D flipflop 66. This causes the output of D flipflop 66 to be reset to a logic zero level. This logic zero level, from the output of D flipflop 66, is converted to a logic one level by inverter 70 which, in turn, is supplied to NAND gate 72. As a result, the output of AND gate 72 assumes a logic one level which, in turn, enables the operation of vector generator 38 and preset counters 28 and 32. Thus, the time during which the vector generator 38 and preset counters 28 and 32 are disabled corresponds to the required RAM access time.

As can be seen from FIG. 2, whenever NOR gate 58 detects a change in the decrement Y or increment Y signals from vector generator 38, it supplies a logic zero level to inverted input AND gate 60. When the $\overline{CLK2}$ signal, which is supplied to the other input of NAND gate 60 assumes a logic zero level, AND gate 60 applies a logic one level to inverter 70. Inverter 70, thereafter, applies a logic zero level to NAND gate 72, thereby disabling vector generator 38 and preset counters 28 and 32. When $\overline{CLK2}$ returns to a logic one level, the output of AND gate 60 returns to a logic zero level, which in turn causes a logic one level to be output from inverter 70. This causes NAND gate 72 to enable the operation of vector generator 38 and preset counters 28 and 32. In this manner, the addresses being generated and applied to screen refresh RAM 14 are maintained at their then existing state for a period of time determined by the period of the $\overline{CLK2}$ signal. The $\overline{CLK2}$ signal is preferably adjusted to correspond to the amount of time required by the screen refresh RAM for access purposes.

For the circuitry shown in FIG. 2, X boundary detection circuity 50 determines when the address, supplied by X address preset counter 32, is addressing the low end or high end of a block of storage sites. Thus, when X address preset counter 32 outputs an address of 79 when in the incrementing mode, or an address of zero when in the decrementing mode, X boundary detection circuit 50 will supply the appropriate disable signal via inverter 70 to the vector generator 38. In the case of storage site 79, bits 4 through 6, received by buffers 58, will be all ones, corresponding to a seven in the tens place of the address. Additionally, preset counter 52 will provide a carry signal at its CO output, indicating that a count of 10 has been reached. The carry signal is received by NAND gate 62, along with the inverted signal on the increment X line from vector generator 38. When all of the above-discussed signals are present, signifying a next address of 80, the "wired OR" 61 will provide a logic zero to NOR gate 64. As discussed above, D flipflops 66 and 68 will then generate the appropriate disable signal with the appropriate pulse-width.

Similarly, when the X address preset counter 32 is being decremented, decade preset counter 52 will supply a carry signal at its CO output, when a zero count is reached. This carry output is supplied to NAND gate 60, along with the inverted-decrement X signal from vector generator 38. Additionally, bits 4 through 6 will all be at a logic zero state. Buffers 58 will apply these logic zero states to the "wired OR" 59. When these conditions are met, the "wired OR" 59 will provide a logic zero signal to NOR gate 64 which, in turn, causes D flipflops 66 and 68 to supply the appropriate disable signal to vector generator 38 and preset counters 28 and 32.

Vector Generator

One embodiment of a vector generator which can be used in the present invention is shown in the lefthand portion of FIG. 2. As discussed above, the vector generator receives magnitude data for the amount of change desired in the X and the Y coordinate directions, as well as the direction of change. The vector generator shown in FIG. 2 implements what is known as the Bresenham vector generation algorithm. This algorithm is well known in the art and is discussed in a paper published in the IBM Journal, Vol. 4, No. 1, pages 25-30, 1965. The Bresenham algorithm provides an optimal sequence of addresses by which a vector can be written into a bit-map type memory which vector connects a starting point to an ending point. As is the case in most digital display systems, in order to display a line which is angled from the horizontal or vertical dimension of the display, such angled line is required to be constructed from a sequence of short horizontal and vertical line segments. When the resolution of the visual display is high enough, these connected line segments appear to the viewer as the desired angled line. The Bresenham algorithm provides a method for specifying the number, placement and interconnection of these horizontal and vertical line segments using only addition or subtraction operations.

In operation, the Bresenham algorithm divides the plane in which the vector lies into octants which are referenced to the starting point of the vector, and then determines in which octant the vector is positioned. An octant corresponds to a pie-shaped segment subtending a 45° angle. For a vector lying in a given octant, the Bresenham algorithm then specifies whether the next pixel of information to be written should be in the storage site wherein only one coordinate of the address is incremented/decremented, or both coordinates of the address are incremented/decremented.

As an example, see FIG. 6, wherein a vector is generated from a starting point corresponding to an XY address of (75, 62) and ends at an ending XY address of (83, 65). Each circle represents the location of a pixel which is to be written. As can be seen from the upper portion of the figure and indicated by the arrows and circles lying along the grid, the Bresenham algorithm provides the increment and decrement control signals by which the addresses generated and supplied to the screen refresh RAM 14 are made to correspond to the circles shown in the figure. Thus, in the first subsequent address from the starting point, the Bresenham algorithm would specify that only the X address be incremented. For the next pixel address, the Bresenham algorithm specifies that both the X and the Y address be incremented. In FIG. 6, the example illustrates the Bresenham algorithm for a vector located in the first octant. For other octants and directions, the address changes specified by the Bresenham algorithm are provided in Table 1.

As can be seen from Table 1, the octant in which the vector lies can be determined by the sign of the change in the X direction, the sign of the change in the Y direction, and whether the magnitude of the change in the X direction is greater than the magnitude of the change in the Y direction. Thus, for example, if the sign of the X change is positive, the sign of the Y change is negative, and the magnitude of the X change is greater than the magnitude of the Y change, the vector is indicated as being located in octant number 7.

TABLE 1

| Sign X | Sign Y | Mag X greater Mag Y | Octant | Sign of Gradient | Incr X | Decr X | Incr Y | Decr Y |
|---|---|---|---|---|---|---|---|---|
| + | + | Yes | 0 | − | 1 | 0 | 0 | 0 |
| + | + | Yes | 0 | + | 1 | 0 | 1 | 0 |
| + | + | No  | 1 | − | 0 | 0 | 1 | 0 |
| + | + | No  | 1 | + | 1 | 0 | 1 | 0 |
| − | + | No  | 2 | − | 0 | 0 | 1 | 0 |
| − | + | No  | 2 | + | 0 | 1 | 1 | 0 |
| − | + | Yes | 3 | − | 0 | 1 | 0 | 0 |
| − | + | Yes | 3 | + | 0 | 1 | 1 | 0 |
| − | − | Yes | 4 | − | 0 | 1 | 0 | 0 |
| − | − | Yes | 4 | + | 0 | 1 | 0 | 1 |
| − | − | No  | 5 | − | 0 | 0 | 0 | 1 |
| − | − | No  | 5 | + | 0 | 1 | 0 | 1 |
| + | − | No  | 6 | − | 0 | 0 | 0 | 1 |
| + | − | No  | 6 | + | 1 | 0 | 0 | 1 |
| + | − | Yes | 7 | − | 1 | 0 | 0 | 0 |
| + | − | Yes | 7 | + | 1 | 0 | 0 | 1 |

Also shown Table 1 are the increment and decrement commands supplied by the vector generator 38 as a function of the octant in which the vector is located, and the sign of a number called the gradient. This gradient is determined by the following equations:

$$\nabla 1 = 2\Delta b - \Delta a \quad (1)$$

$$\nabla i + 1 = \nabla i + 2\Delta b - 2\Delta a, \text{ if } \nabla i > 0 \ \nabla i + 2\Delta b, \text{ if } \nabla i \leq 0 \quad (2)$$

where the values of delta a and delta b are equal to the magnitude of the change in the X direction or the change in the Y direction, depending upon the octant in which the vector lies. Thus, if the vector lies in octant 0, delta a will be equal to the magnitude of the change in the X direction, while delta b will be equal the magnitude of the change in the Y direction. Conversely, if the vector were in octant number 5, delta a will be equal to the magnitude of the change in the Y direction, while delta b will be equal to the magnitude of the change in the X direction. Given the assignment of values for delta a and delta b, equations 1 and 2 are utilized to determine the value of the gradient of the address for the next pixel; i.e., pixel i+1, see equation (2). Equation (1) provides the value of the gradient for the starting point of the vector.

From equation (2), the sign of the gradient for pixel i+1 is used along with the octant location of the vector in order to designate whether the XY addresses will be incremented or decremented. This can be seen in the six right-most columns of Table 1. Thus, if the vector lies in octant 3 and the sign of the gradient is negative, the X address will be decremented while the Y address will be incremented. Similarly, if the vector lies in octant 6, and the sign of the gradient is negative, only the Y address will be changed, in this case decremented.

Referring to FIG. 2, direction ROM implements the contents of Table 1. Direction ROM 74 receives the sign of the change in the X direction, the sign of the change in the Y direction, an indication whether the magnitude of the X direction change is greater than or equal to the magnitude of the Y direction change, and the sign of the gradient. The determination of the octant within which the vector lies is accounted for in the arrangement of the contents of direction ROM 74 in relation to the values of the sign of the X change, the sign of the Y change, the sign of the gradient, and the relative magnitude of the X and Y change.

As can be seen from Table 2 and from Table 1, the values for delta a and delta b can be assigned according to whether the change in the X direction is greater than or equal to the change in the Y direction or is less than the change in the Y direction. If the change in the X direction is greater than the change in the Y direction, then delta a would be assigned the change in the X direction quantity while delta b would be assigned the change in the Y direction quantity. Conversely, if the change in the X direction is less than the change in the Y direction, delta a would be assigned the change in the Y direction quantity while delta b would be assigned the change in the X direction quantity. The relative magnitude determination and the assignment of the delta a and delta b quantities are performed within the gradient determination circuitry 76. Gradient circuitry 76 implements equations (1) and (2).

TABLE 2

| OCTANT | $\Delta a = |\Delta_-|$ | $\Delta b = |\Delta_-|$ |
|---|---|---|
| 0 | X | Y |
| 1 | Y | X |
| 2 | Y | X |
| 3 | X | Y |
| 4 | X | Y |
| 5 | Y | X |
| 6 | Y | X |
| 7 | X | Y |

Within gradient circuitry 76, comparator 76 receives the magnitude of the X change and magnitude of the Y change and provides an indication at its output as to whether the change in the X direction is less than the change in the Y direction. This indication is inverted by inverter 82 to provide an indication as to whether the change in the X direction is greater than or equal to the change in the Y direction. This indication is supplied to direction ROM 74 and to the select inputs of multiplexers 84 and 86. Multiplexer 84 receives the change in the Y direction quantity as its first input and the change in the X direction quantity as its second input. Conversely, multiplexer 86 receives the change in the X direction as its first input and the change in the Y direction quantity as its second input. As such, when the change in the X direction quantity is larger than the change in the Y direction quantity multiplexer 84 will provide at its output the change in the Y direction quantity, while multiplexer 86 will provide at its output the change in the X direction quantity. Conversely, when the change in the X direction quantity is less than the change in the Y direction quantity, multiplexer 84 will supply the X direction quantity at its output, while multiplexer 86 will provide the Y direction quantity at its output. It should be noted that the inverted output of multiplexer 82 is utilized. This is so that a 2's complement subtraction can be used in this implementation.

The inverted output of multiplexer 84 provides the inverted delta a element while the output of multiplexer 86 provides the delta b element of equations (1) and (2). Summer 88 receives the output from multiplexer 84 at one of its inputs, and the output from multiplexer 86, which has been shifted upwards one bit, at its other input to provide an output quantity representative of equation (1). The input received from multiplexer 86 is shifted upwards by one bit, where the added bit is a logic zero, so that the effect of this shift is to multiply the inputted quantity by two. Thus, the output of summer 88 will be two times delta b minus delta a.

Similarly, summer 90 receives the output from multiplexer 84 and shifts this quantity upwards by one bit. Here, because an inverted quantity is being received, the added bit is assigned a logic 1 state. The summer 90 also receives the output from multiplexer 86 and shifts this output upward by one bit, wherein the added bit is a logic zero. As before, this effectively multiplies a quantity by two. Thus, the output of summer 90 is two times delta b minus two times delta a. Multiplexer 92 receives the output from summer 90 at its first input and the output from multiplexer 86 at its second input. The quantity received by multiplexer 92 from multiplexer 86 is shifted upward by one bit, where the added bit is a logic zero, so as to multiply the quantity by two. The output of multiplexer 92 is selected to correspond to the quantity at either the first input or second input, depending upon the sign of the gradient. The sign of the gradient is the most significant bit of the output of gradient circuitry 76.

In the embodiment shown in FIG. 2, wherein 16 bit words are used, the sign of the gradient will be found in the 16th bit. If the sign of the gradient is positive, multiplexer 92 will output the quantity received from summer 90. On the other hand, if gradient is negative, multiplexer 92 will output the quantity, which is then multiplied by two, received from multiplexer 86. The output of multiplexer 92 is added, in summer 94, to the gradient quantity which is fed back from the output of gradient circuitry 76, via line 96. This gradient quantity represents the gradient quantity for the previous iteration, i.e. the gradient for pixel i.

The output from summer 94 thus provides an output which satisfies equation (2) above.

Multiplexer 96 permits the selection of the initial condition described by equation (1) above when the vector generator first begins the generation of a new vector. Thus, multiplexer 96 receives at its first input the output from summer 88 and receives at its second input the output from summer 94. An initial condition select signal is applied to the select input of multiplexer 96 from the system processor 25. Thus, when the vector generator initially begins generation of the new vector, summer 88 will provide at its output a quantity representative of the relationship two times delta b minus delta a. Thereafter, multiplexer 96 will provide an output which corresponds to the output of summer 94.

Latch 98 receives the gradient information from multiplexer 96 and holds this quantity for use in the next iteration. The output of latch 98 is thus provided via line 97 to summer 94 and multiplexer 92. Also, the most significant bit, being the sign bit of the gradient, is supplied to direction ROM 74.

In the above manner, equations (1) and (2) and Tables 1 and 2 above are implemented in the present invention.

Referring to FIG. 6, an example of the operation of the present invention is provided. Shown in the upper portion of FIG. 6 is a portion of the visual display screen. A vector, indicated by reference numeral 100, is desired to be written beginning at XY starting point (75, 62) and ending at XY point (83, 65). Thus, the change in the X direction, which is positive, totals eight units while the change in the Y direction, which is also positive, totals three units. From Table 1, it can be seen that the vector is located in octant zero.

In the lower portion of FIG. 6, the first column corresponds to the gradient; the second column corresponds to the scan line address of the storage site into which the pixel is to be written; the third column corresponds to the address of the block of storage sites within the scan line which contains the pixel to be written into; the fourth column corresponds to the storage site within the addressed block which is to receive the pixel; and the fifth and sixth columns indicate whether an X or a Y boundary has been detected. Shown underneath the column headings are the bit numbers for each of the addresses. The scan line address, in column 2, includes 10 bits. The block address, in column 3, includes 4 bits, while the site address includes 7 bits.

The first set of addresses can be seen to correspond to the XY starting address (75, 62). On the first iteration, the gradient is determined to be a negative 2. From Table 1, it can be seen that in octant zero, whenever the sign of the gradient is negative, only the X address will be incremented. Thus, in the top portion of FIG. 6, it can be seen that, for the first iteration, only the X address is incremented. Thus, in column 4, the site address is seen to be increased by one. At this point, the pixel being written into is still within storage block 0000.

For the next iteration, the gradient is determined to be a positive 4. From Table 1, it can be seen that for octant zero, and a positive gradient, both the X and Y addresses are to be incremented. Thus, from the top of FIG. 6 it can be seen that the next pixel is written into a location wherein both the X and Y addresses have been incremented. This is reflected in the second and fourth columns of FIG. 6. Also, as discussed above, the boundary-detect circuitry 48 provides a signal to vector generator 38 whenever a change in the Y address or column address as detected. This indication causes the vector generator 38 to slow its operation for a short period of time so that the addresses supplied by the vector generator to RAM 14 are presented thereto long enough to satisfy the RAM access time requirements. Thus, in FIG. 6, column 6, a logic 1 is provided at the boundary-detect output to indicate that a Y boundary has been detected.

Referring to the fourth and fifth iterations in FIG. 6 and specifically column 4, it can be seen that between the fourth and fifth iterations, the site being addressed crosses the block boundary i.e., moves from address 79 in block 0000 to address 1 in block 0001. In column 5, it can be seen that a logic 1 is provided to indicate that a block boundary transition has been detected. Recall from the discussion above that the addressing within the storage sites within a block are in binary coded decimal form. Thus, the four least significant bits are a binary representation of a decimal count while the three most significant bits are a pure binary count. Thus, in the fourth iteration, the four least significant bits have a 1001 logic state, corresponding to a decimal 9, and the three most significant bits have a 111 state corresponding to a decimal 7. On the next iteration, the X address is incremented, in accordance with Table 1, and the storage site addresses make a transition from the 79th storage site in block 0000 to the first storage site in block 0001. As discussed above, a boundary indication from boundary detector 50 causes the vector generator to slow its operation for a short period so that the RAM 14 has enough time to accept the new address from vector generator 38. Recall that bits 0 through 9 of the scan line address in FIG. 6 and bits 7 through 10 of the X address in FIG. 6 are supplied to the address inputs of RAM 14. Also recall that the storage site address in Column 4 of FIG. 6 is supplied to a BCD decoder circuit 36, which in turn provides chip enable signals to the individual random access memories within RAM 14. Thus, so long as the only changes in the addressing provided from vector generator 38 are in the storage site addressing of column 4, corresponding to the enable signals to RAM 14, the vector generator 38 can operate at high speed. However, whenever there is a change in the scan line address, column 2, FIG. 6, or the X address, Col. 3, FIG. 6, the vector generator 38 is slowed for a short period to permit the new address to be accepted by RAM 14.

In the above manner, the vector generator 38 and RAM 14 can be operated at high speed when no new addressing is required to be made and slowed down only when a new address is sought to be applied to RAM 14. Additionally, once the new address has been supplied to RAM 14, the vector generator 38 and RAM 14 can again be operated at the higher speed.

The circuitry of vector generator 38 can be implemented by commercially available parts. Suitable commercial part numbers for the various functional blocks shown in FIG. 2 are provided in Table 3.

TABLE 3

| Functional Block | Commercial Part No. | Manufacturer |
| --- | --- | --- |
| Comparator 78 | 74LS85 | Signetics Corp., Sunnyvale, CA |
| Multiplexer 84 | 74LS158 | Signetics Corp., Sunnyvale, CA |
| Multiplexer 86 | 74LS157 | Signetics Corp., Sunnyvale, CA |
| Summer 88, 90 | 74LS283 | Signetics Corp., Sunnyvale, CA |
| Multiplexer 92, 96 | 100155 | Motorola, Inc., Phoenix, AZ |
| Summer 94 | 100180 | Motorola, Inc., Phoenix, AZ |
| Latch 98 | 100141 | Motorola, Inc., Phoeniz, AZ |

Surface-Fill or Polygon-Fill

FIG. 7 illustrates the interaction of the surface fill circuitry with the system processor 25 and the vector generator circuitry 38. The surface fill circuitry includes a coordinate data generator 200, which is similar to vector generator 38; a presettable counter 202, which is similar to X address preset counter 32; and sequencer circuitry 204. Coordinate data generator 200 receives line segment data from system processor 25 via data bus 206. This line segment data includes the sign of the change in the X direction, the sign of the change in the Y direction, the magnitude of the change in the X direction, and the magnitude of the change in the Y direction for the line segment being evaluated. Counter 202 receives the X address starting point for the line segment from system processor 25 via data bus 206.

Sequencer circuitry 204 receives control instructions from and supplies status information to system processor 25 via control/status bus 208. In turn, sequencer circuitry 204 coorindates the operation of the surface fill circuitry with that of the vector generator 38 and system processor 25 so that a smooth and efficient transaction in operation between vector generation and surface fill generation is obtained. Finally, system processor 25 receives data from coordinate data generator 200 and counter 202 via bus 210.

Coordinate data generator 200 operates in substantially the same manner as the circuitry in vector generator 38. In response to magnitude and sign data supplied to it from the system processor 25, the coordinate date generator provides increment and decrement instructions for X and Y addresses, where the X and Y addresses define points which collectively form a line segment on visual display 10. As with vector generator 38, coordinate data generator includes a gradient processor 212 which operates in substantially the same manner as gradient circuitry 76 in FIG. 2, and direction ROM 214, which operates in substantially the same manner as direction ROM 74 in FIG. 2.

Note, however, that in FIG. 7, system processor 25 receives current processor parameters from gradient processor 212 via bus 210 and lines 216. These processor parameters represent the current value being provided by the gradient processor 212 for equation (2) above. Referring to FIG. 2, the portion of the gradient processor circuitry 76 at which these processor parameters are available can be seen where lines 97 emerge from latch 98. The current processor parameters provided to system processor 25 on lines 216 are provided from a like point in gradient processor 212. As discussed earlier in the specification, the data on line 216 reflects the current magnitude of the gradient as determined by equation 2, supra.

A further difference is that, in the surface fill circuitry, the increment and decrement Y signals are not used to control a presettable counter, such as Y address preset counter 28. Instead, the increment Y and decrement Y signals are supplied to system processor 25 via bus 210 and line 218.

In all other respects, gradient processor 212 operates in substantially the same manner as gradient processing circuitry 76; direction ROM 214 operates in substantially the same manner as direction ROM 74; and counter 202 operates in substantially the same manner as X address preset counter 32; all of the latter being discussed in detail above.

The operation of the present invention can be best understood by way of example. FIGS. 9a through 9c, and the flow chart of FIG. 8 illustrate the generation of a surface fill table, and then the use of the surface fill table to fill in a surface bounded by a plurality of line segments. In FIG. 9a, a surface is shown which is bounded by line segments AB, BC, CD, DE, EF, FG and GA. In the operation of the invention, line segment data defining each of these line segments are either supplied by the user to the system or calculated at another point in the system operation. The line segment data for each of the line segments include the starting point of each line segment, the magnitude of change in the X and Y direction, and the sign of the change in the X and Y direction.

As indicated in FIG. 8, system processor 25 loads the line segment data for a particular line into the surface fill circuitry, step 220. Thus, for line segment AB, gradient processor 212 will receive an X-change magnitude of 5 and a Y-change magnitude of 4. Direction ROM 214 will receive a negative value for sign X and a negative value for sign Y. Finally, preset counter 202 will receive an X address preset of 5.

In step 222 of FIG. 8, system processor 25 sends an instruction via sequencer circuit 204 to cause the surface fill circuitry to begin evaluating the current line segment. As a result of this evaluation, increment and decrement instructions are output by direction ROM 214 to X address preset counter 202 and OR gate 224. Referring to FIG. 9a, the increment/decrement instructions from direction ROM 214 define points 226, 228, 230, 232 and 234. For point 226, the instruction would be to decrement both the X and the Y address; for point 228, the instruction would be to decrement both the X and the Y address; however, for point 230, the instruction would be to decrement the X address only. Finally, in connection with points 232 and 234, the instructions would be to decrement both the X and the Y addresses. These instructions are shown in symbolic form by the arrows which connect the points together.

In a similar manner, coordinate data generator 200 generates instructions which are definitive of points for the other line segments which bound the surface to be filled.

However, rather than generating the actual line segment from the supplied instructions, as was the case with the circuitry of FIG. 1, the instructions are evaluated by system processor 25 to derive end point information therefrom. To to do this, system processor 25 in steps 236 and 238, FIG. 8, examines the increment/decrement instruction for the Y address and records the address present in counter 202 whenever there is an instruction to increment or decrement the Y address. By monitoring the decrement/increment instructions in this manner, the end points for parallel line segments can be obtained, which line segments collectively fill in the surface of interest.

This can be more clearly seen in FIGS. 10a and 10b wherein the end points derived by the present invention are illustrated. FIG. 10a illustrates the collection of points which would be normally defined by the decrement/increment instructions from coordinate data generator 200 for each of the line segments. In FIG. 10b, a box around a particular point indicates that such point would be selected by system processor 25 as an end point for one of the parallel line segments. Thus, with respect to line segment AB, points 226, 228, 232 and 234 would be selected as end points, while point 230 would not be selected as an end point.

The instructions for each of the selected points include an instruction to change the Y address, while the instruction for the generation of point 230 includes only an instruction to decrement the X address. As can be seen in FIG. 10b, by selecting as end points those addresses which result from an instruction to change the Y address, there is provided a consistent scheme by which, for any particular line segment, a single X address is designated as the end point address for each Y address of the line segment.

In a similar manner, X address end points are selected for each of the line segments and correlated to their corresponding Y address. When the selected points having a common Y address are examined, these points will constitute the end points for a horizontal line corresponding to that particular Y position. Thus, in FIG. 10b, it can be seen that there would be two end point addresses correlated to a Y address of 1: That for point 226 and that for point 240. Similarly, for Y address 3, the correlated end points would be that of of point 232 and point 242. FIG. 10c illustrates the correlation of the end points as a function of their Y address and grouped by their corresponding line segment.

The order in which each line segment is evaluated, and the order in which the surface fill table is constructed has many variations. Preferably, the order of evaluation and formation should be selected to minimize the amount of time required between a request by the user to fill a space in and the actual accomplishment of the operation on a visual display. One sequence which has been found to be satisfactory in minimizing the required of time is illustrated in FIGS. 9b and 9c and in the flow diagram of FIG. 8.

The scheme involves dividing the surface to be filled-in into a number of subdivisions. The division between each subdivision is selected to occur at each end point of a line segment and to extend in the Y dimension across the surface until it intersects with a line segment on the opposite boundary of the surface. Thus, in FIG. 9b, segment AG has an end point G. A hypothetical horizontal line segment is extended across the surface until it intersects with a point on line segment AB. This point is labelled AB' in FIG. 9b. Similarly, line segment AB has an end point B. A hypothetical horizontal line is extended across the surface from point B until it intersects with a point on line segment GF. This point is labelled FG" in FIG. 9b. This process continues until subdivisions corresponding to the various end points are defined in a similar manner. Thus, as is shown in FIG. 9b, the surface can be subdivided into a number of subdivisions, among those subdivisions being subdivision A-AB'-G, B-AB'-G-FG", BC'-B-FG"-FG', C-BC'-E-DE', F-E-FG', and D-C-DE'.

Flagging the end points of the line segments in this manner also permits the processor to distinguish concave portions of the surface. As can be seen from FIG. 9a, the portion of the surface bounded by line segments DE and EF is concave. If the processor 25 were to process line segments BC and GF without knowledge of line segments DE and EF, horizontal line segments would be defined which extend outside of the surface and through the portion of the visual display below line segments DE and EF. With the Y address corresponding to point E flagged, processor 25 will be alerted to the existence of the concave condition of the surface.

As can be seen from FIG. 9b, the end points for the horizontal segments of the subdivisions above do not necessarily fall directly on one of the original line segments, AB, AG, GF, FG, ED, DC or CD. Instead, the end points are selected from among the points which are generated from the information provided by the coordinate data generator 200. Thus, it can be seen that the specific X coordinate of each end point need not be determined beforehand. Instead, the Y coordinate for the end point of each line segment is flagged, e.g., for line segment AG, the Y coordinate of 1 is flagged.

For the line segments shown in FIG. 9b, the flagged Y values would include 0, 1, 4, 6, 8, 9 and 11. When the coordinate data generator 200 is processing a particular line segment, and provides an instruction to change the value of the Y coordinate, such that a flagged Y coordinate is produced, the system processor 25 will be alerted that the end of a subdivision has been reached, and that appropriate action should be taken.

Thus, in processing segment AB, for example, system processor 25, upon reaching a Y value of 1, would know that the end of a subdivision had been reached. As shown in FIG. 8, step 244, the system processor would then proceed to step 246 to save the current position data on line 216 from coordinate data generator 200. System processor 25 would then proceed to step 248 to determine whether the line segment on the other side of the subdivision had been processed. If not, the line segment data for the segment bounding the other side of the surface subdivision would be loaded into the coordinate data generator 200 and processed. In the current example, the line segment data for line segment AG would be loaded into the coordinate data generator 200 and processed through steps 222, 236, 238 and 244 in FIG. 8.

For each set of instructions provided by coordinate data generator 200, the system processor 25, in step 250, determines whether the end point of a segment has been reached. If not, the system continues to execute steps 222, 236, 238, 244 and 250 until the end of the segment is reached. If, in step 250, it is determined that the end of the segment has been reached, the system processor 25 verifies, in step 248, that the other side of the subdivision has been processed. If so, system processor 25 transfers the data from the surface fill table into vector generator 38 to cause the subdivision to be filled; see step 252.

Thereafter, the system processor returns to step 220 and loads in the data for the next line segment. If a line segment has not been completely processed, such as line segment AB in the present example, the current position data, that was stored when the flagged Y value was reached, is reloaded into the gradient processor 212 of coordinate data generator 200 and the processing of line segment AB is resumed. This operation saves valuable operating time, in that the gradient process 212 need not reprocess the line segment data anew in order to get to the state it was in when processing was halted.

To continue the present example, after system processor 25 has caused subdivision AB'-A-G to be filled in, in step 252, it returns to point AB' of line segment AB, in step 220, and loads the position data for that point into processor 212 via line 206. Coordinate data generator 200 then continues processing line segment AB, starting from point AB', and coordinates the X address value for each change in Y address value, until either a flagged Y address is reached, or the end of the segment is reached. In the example of FIG. 9b, no further flagged Y values would be found in the evaluation of line segment AB.

When the end of the line segment is reached, the system processor, in step 250, will proceed to step 248 in which the line segment for the other side of the subdivision would be processed. In this case, the line segment would be line segment GF. In step 253, the line segment data for line segment GF would be loaded into coordinate data generator 200 and processing of the segment would proceed in step 222. As can be seen from FIG. 9b, the Y coordinate which corresponds to point B would be flagged so that when piont FG" is reached, system processor 25 will proceed from step 244 to step 246. The current position data would be saved in step 246, and in step 248, it would be determined that the other side had already been processed. Thus, the system processor 25 would proceed to step 252 to cause the data from the surface fill table to be transferred to vector generator 38 to fill in subdivision B-AB' - D-FG".

Referring to FIG. 9c and FIG. 10c, the surface fill operation will now be discussed in greater detail. The surface fill table for the subdivision would include the Y and X addresses indicated by bracket 254 in FIG. 10c. As mentioned earlier, vector generator 38 can be the type which accepts end point information or one which accepts magnitude and direction information. In the embodiment shown in FIG. 7, generator 38 utilizes direction, magnitude, and starting point information. Thus, system processor 25 would convert the end point information from the surface fill table into starting point, direction and magnitude information. Furthermore, because the vectors utilized to fill a surface are parallel to a selected dimension, in this case, the Y coordinate dimension, it can be assumed that the magnitude of change in the selected dimension, i.e., the Y dimension, will be 0 for points in any one of the surface-fill vectors. Thus, the only information required to be supplied to vector generator 38 by system processor 25 would be the starting point of a vector, the magnitude of change in the X direction and the direction of change in the X direction.

It is to be noted that, because there is no change in the Y direction, and because both end points for each horizontal fill vector are provided by the surface fill table, system processor 25 can specify that a particular vector start from either the left side or the right side of the surface. Thus, this information can be specified to optimize the efficiency of the surface fill operation.

In the case where system processor 25 designates that all horizontal fill vectors start from the lefthand side of the surface, the information shown in Table 4 would be provided by system processor 25 to vector generator 38 on a vector-by-vector basis. Thus, as shown in FIG. 9c, surface B-AB'-G-FG" would be filled in by a plurality of parallel, horizontal vectors indicated by the "X" marks.

TABLE 4

| Surface Fill Information for B-AB'-G-FG" | | | |
|---|---|---|---|
| Starting Point (X,Y) | $|\Delta Y|$ | $|\Delta X|$ | SIGN $\Delta X$ |
| (4,1) | 0 | 6 | + |
| (3,2) | 0 | 7 | + |
| (1,3) | 0 | 8 | + |
| (0,4) | 0 | 9 | + |

In a similar manner, each of the line segments which bound the surface would be processed. As a flagged Y value in a line segment is reached, the system will process all other line segments which bound the corresponding subdivision, and upon completion of processing the particular line segment, cause the subdivision to be filled in with horizontal parallel vectors. This process continues until the processing of all line segments has been completed.

It is to be understood that the Y dimension has been chosen to be the dimension to which the surface fill vectors are made parallel because of the nature of typical rastor scanning displays. In these displays, an electron beam is swept across the screen in a horizontal direction so that a plurality of parallel horizontal lines are generated. Thus, the choice of using vectors parallel to the horizontal dimension minimizes the amount of information required to be supplied to a vector generator in order to generate such vectors. It is also to be understood that in other types of rastor scanning display apparatus, such as where the scan lines are oriented vertically, the surface fill vectors will be chosen to be parallel to the vertical dimension, or whatever dimension minimizes the amount of information required to be supplied to a vector generator for generating such surface fill vectors.

Referring to FIG. 11, an alternate embodiment of the present invention will now be described. There, instead of a single coordinate data generator circuit 200, two such circuits 200 and 201 are utilized in parallel. With such a configuration, both line segments of a subdivision can be processed simultaneously and the surface fill vector information supplied to the vector generator 38 on a near real time basis. Thus, for example, coordinate data generator 200 will receive the left side line segment information from system processor 25 via data bus 206, while coordinate data generator 201 would receive the data for the right side line segment via data bus 206 from system processor 25. Upon completion of the loading step, step 254 in FIG. 12, both coordinate data generators would be run in parallel in step 256.

As can be seen in FIG. 11, the decrement/increment X instructions from coordinate generator 200 control X position counter 202, as before. The decrement/increment X instructions from coordinate data generator 201 control the operation of X position counter 203. X position counter 202 is preset with the X address starting point for the left side line segment of a subdivision, while X position counter 203 is preset with the starting X address of the right side line segment. The output of each counter is connected to magnitude circuit 258 which, instantaneously, calculates the magnitude of the difference between the outputs of the two counters. Additionally, the output of X position counter 202 controls circuit 260.

As before, the decrement/increment Y instructions from coordinate generator 200 are input to OR gate 224. Similarly, the decrement/increment Y instructions from coordinate generator 201 are connected to OR gate 225.

The output of OR gate 224 is supplied to system processor 25 via sequence control circuit 204 to one input of AND gate 266, and to the input of latch 268. Similarly, the output of OR gate 225 is supplied to system processor 25 via sequence control circuit 204 to the other input of AND gate 266, and to the input of latch 270. The inverted output of latch 268 is connected to one input of AND gate 262, while the inverted output of latch 270 is connected to one input of AND gate 264. The other input to AND gate 262 and 264 is the "next pixel" signal from data bus 206. Recall that the "next pixel" signal instructs the coordinate data generators 200 and 201 to generate the instructions for the next point in their respective line segments.

In the above structure, whenever a decrement/increment Y signal is output by either of the coordinate date generator 200 or 201. The associated latch circuits 268 and 279, respectively, are set to provide a logic zero to their respective AND gate 262 or 264. When this occurs, the "next pixel" signal is disabled from application to the coordinate data generator from which the decrement/increment Y signal originated. This temporarily suspends the operation of the associated coordinate date generator while permitting the other coordinate data generator to continue processing until a decrement/increment Y signal is produced therefrom. In this manner, the X position for the left side end point and for the right side end point will be present in the X position counters 202 and 203, respectively, when both OR gates 224 and 225 indicate that a decrement/increment signal is present from their respective coordinate data generators.

When such is the case, the output of AND gate 266 will be a logic one which will cause control circuit 260 to supply magnitude, sign, and starting address information to vector generator 38 and associated circuitry. Also, the output of AND gate 266 is provided to the enable line of vector generator 38 to begin the operation of vector generator 38.

The output of AND gate 266 is also connected to the reset inputs of latches 268 and 270. When AND gate 266 provides an output logic one, this removes the logic zero state from AND gate 262 and AND gate 264 to permit coordinate data generators 200 and 201 to continue to process their respective line segments.

Referring more particularly to control circuit 260, it can be seen that control circuit 260 receives the X position signal from X position counter 202, and thus provides a starting point to X address preset counter 32 which is taken at the left side of the surface to be filled. Also, control circuit 260 receives a signal which is representative of the magnitude of the difference between the X position from X position counter 203 and the X position from X position counter 202.

Control circuit 260 receives a Y address preset signal from signal processor 25 via data bus 206. This Y address preset signal is loaded into a preset counter 272 within control circuit 260. The count within preset counter 272 is updated for each logic one state out of AND gate 266. The output of counter 272 represents the current Y address or scan line of visual display which is written into. Thus, when a surface is being filled, the Y address preset information supplied to control circuit 260 from system processor 25 will be the first scan line which contains a point of the surface to be filled. In the case of the example shown in FIGS. 9a through 9c and 10a through 10c, the Y address preset would be zero.

The operation of the just described circuitry will be more readily understood upon consideration of the flow diagram of FIG. 12. After the coordinate data generators 200 and 201 have been enabled in step 256, the system monitors the outputs of OR gate 224 and 225 to determine whether a change in the Y coordinate is in order. See step 274. If no Y change is in order, the system proceeds to step 276 to determine whether the end of a line segment has been reached by either coordinate data generator. If not, the system processor returns to step 256 and continues to permit the coordinate data generators 200 and 201 to process their respective line segments.

If, in step 274, a change in the Y address is in order, system processor 25 proceeds to step 278 in which the new Y address is examined to determine whether it has been flagged. If so, the current parameters from the gradient processor from which the decrement/increment Y instructions were received are recorded, step 280. Thereafter, or if the Y value has not been flagged, the operation of the gradient processor is suspended until the other coordinate data generator produces a decrement/increment Y signal, step 282.

In step 284, the other processor is permitted to continue processing until a change in the Y address is indicated. When this occurs, vector generator 38 is enabled, step 286, and the magnitude signal from magnitude circuit 258, the count in preset counter 272, and the starting X position from X position counter 202 are provided to vector generator 38. Also supplied are a Y magnitude of zero and a positive sign Y and a positive sign X. Upon receipt of this information, the vector generation circuitry described earlier generates the horizontal line corresponding to the information supplied. Thereafter, system processor 25 proceeds to step 288 in which it determines whether the current Y address was a flagged Y address. If not, system processor 25 returns to step 256 to continue processing the current line segment.

If, on the other hand, it is determined that the Y address was a flagged Y, the system processor 25 returns to step 254 to load in the current parameters of the appropriate coordinate data generator. The other coordinate data generator would be supplied by system processor 25 with the appropriate line segment data for the next subdivision of the surface to be filled in.

In the above manner, coordinate data generators 200 and 201 can provide starting point, magnitude and sign information to vector generator 38 on a vector-by-vector basis, with vector generator 38 writing one vector while the coordinate data generators are generating instructions for the next vector. As is evident, the above-described structure provides for a high-speed surface fill capability.

In a further alternative embodiment, the vector information from coordinate data generators 200 and 201 can be accumulated by system processor 25 for each subdivision of the surface to be filled. When the information for one subdivision is complete, system processor 25 can then transfer the information to vector generator 38 to permit vector generator 38 to fill in the subdivision all at once. This alternative embodiment can be obtained by the structure shown in FIG. 11.

The terms and expressions which have been employed here are used as terms of description and not of limitations, and there is no intention, in the use of such terms and expressions of excluding equivalents of the features shown and described, or portions thereof, it being recognized that various modifications are possible within the scope of the invention claimed.

I claim:

1. In a computer graphics system wherein a visual image can be formed on a visual display, an apparatus for filling-in a surface within the visual image, which surface is bounded by a plurality of designated line segments, each of the designated line segments being defined by corresponding line segment data supplied by the user, the apparatus comprising first means responsive to the line segment data for generating coordinate data which locate points on the visual display, which points collectively form each designated line segment, each of the points being located by a first address along a first dimension of the visual display and a second address along a second dimension of the visual display, the coordinate data including, for each point, a change-first address signal and the second address, wherein the change-first address signal indicates whether the first address for a particular point is to change from the first address of an adjacent point;

means responsive to the coordinate data for constructing a surface-fill table which includes the first and second addresses for each point for which the coordinate data instructs a change in the first address, the surface-fill table thereby providing end points of parallel line segments which can collectively fill-in the surface when formed on the visual display; and means responsive to the surface fill table for writing the parallel line segments into the visual display.

2. The apparatus of claim 1 wherein the first means include vector generator means responsive to the line segment data for converting the line segment data into coordinate data in accordance with a Bresenhem algorithm.

3. The apparatus of claim 1 wherein the surface-fill table constructing means include means for storing the surface-fill table;

means coupled to the first means and responsive to the change-first address signals in the coordinate data for generating the first address for each point for which the corresponding change-first address signal instructs a change in the first address; and control means coupled to the first address generating means and the storing means and responsive to the second address signal for supplying for storage in the storing means the first and second addresses of each point for which the coordinate data instructs a change in the first address, so that the stored first and second addresses define the surface-fill table.

4. The apparatus of claim 1 wherein the visual display includes a raster scanning display wherein a visual image is generated by modulation image intensity along a plurality of parallel raster scan lines and further wherein the first dimension of the visual display is defined to lie in a direction perpendicular to the raster scan lines and the second dimension of the visual display is defined to lie in a direction parallel to the raster scan lines, so that each of the first addresses in the surface-fill table designate a raster scan line and each of the corresponding second addresses designate a point along a particular raster scan line.

5. The apparatus of claim 2 wherein a line segment can be defined a starting address, a magnitude of change of the line segment in the first and second dimensions, and a direction of change of the line segment in the first and second dimensions, and further wherein the line segment data for each line segment include a starting address, data representative of the magnitude of change of the line segment in the first and second dimensions, and data representative of the direction of the change of the line segment in the first and second dimensions, and further wherein the vector generating means include means responsive to the magnitude of change data for determining whether the magnitude of change in the second dimension is greater than that in the first dimension, and for determining a gradient signal, the gradient signal being determined for each point of each line segment in accordance with the relationship Sign of $(2\Delta b - 2\Delta a) + S$, if $S > 0$.

Sign of $(2\Delta b + S)$, if $S > 0$, wherein S equals the gradient signal for a previous point of the line segment, Δb equals the larger magnitude of the change in the first and second dimensions, and Δa equals the smaller magnitude of the change in the first and second dimensions;

means responsive to the direction of change data and to the gradient signal, for providing the change-first-address signal and a change-second-address signal in accordance with the Bresenhem Algorithm; and means responsive to the change-second-address signal and to the second dimension starting address of the line segment for providing the second address for each point being defined by the change-first-address and change-second-address signals.

6. The apparatus of claim 2 further including means for classifying the line segments which bound the surface to be filled into right side and left side line segments; wherein the right side line segments include the starting points of the surface-fill segments and the left side line segments include the end points of the parallel fill segments;

second means responsive to the line segment data for generating coordinate data which locate points on the visual display which points collectively form each line segment; and control means coupled to the classifying means for selectively supplying the left side line segments to the first coordinate data generating means and the right side line segments to the second coordinate data generating means so that the end points of the surface-fill segments can be concurrently determined and supplied to the vector generator means.

7. In a computer graphics system wherein a visual image can be formed on a visual display, an apparatus for generating fill-segment data which are definitive of vectors by which a surface of the visual image can be filled-in, the surface being bounded by a plurality of line segments, the line segments being defined by corresponding line segment data, the apparatus comprising means responsive to the line segment data for generating coordinate data, the coordinate data defining addresses which locate points that collectively form the plurality of line segments on the visual display, wherein each point is located by a first address along a first dimension of the visual display and a second address along a second dimension of the visual display, and further wherein the coordinate data provide the second address and a change-first-address signal for each point, the change-first-address signal indicating whether the first address for the current point is to be changed from the first address of a previously defined point; and means responsive to the coordinate data for recording the first and second addresses of each point for which the corresponding change-first-address signal indicates an address change, whereby the recorded first and second addresses are the fill-segment data which represent end points of a plurality of parallel vectors by which the surface of the visual image can be filled-in.

8. In a computer graphics system, an apparatus for filling surfaces with a visual display, wherein the surfaces are circumscribed by specified line segments, the line segments being defined by line segment data, the apparatus comprising evaluating means responsive to the line segment data for addressing points on the visual display which collectively form the specified line segments, wherein the addressing for each of the points includes a first address along a first dimension of the visual display and a second addresses along a second dimension of the visual display;

means coupled to the evaluating means and responsive to the addressing for recording the first and second addresses for a corresponding point whenever the first address for the point changes from that of the previously addressed point, and for correlating all recorded addressing having the same first address, whereby the correlated addressing define end points for a plurality of parallel vectors by which the surfaces within the visual display can be filled in; and means coupled to the visual display and to the evaluating and correlating means and responsive to the correlated addressing for writing vectors in the visual display as defined by the correlated addressing.

9. The apparatus of claim 8 wherein the evaluating means include means for generating the addressing for each point in accordance with the Bresenhem Algorithm as applied to the line segment data for the specified line segments.

10. The apparatus of claim 8 wherein the writing means include vector generator means responsive to the correlated addressing for generating addresses by which points can be located on the visual display, which points collectively form parallel line segments, and which parallel line segments collectively fill-in the surface within the visual display.

11. The apparatus of claim 10 wherein the line segment data for each of the specified line segments include a starting point, a magnitude change, and a direction of change, the starting point including a first dimension starting address and a second dimension starting address, and further wherein the generating means include means responsive to the magnitude change, and direction change for providing address change instructions which specify a change from the starting address in the first dimension the second dimension, or both the first and second dimensions; and counting means responsive to the starting point and to the address change instructions for counting from the first and second starting addresses in accordance with the address change instructions to provide the first and second addresses for the points being addressed by the evaluating means.

12. The apparatus of claim 7 wherein each line segment is defined by corresponding end point addresses, including an end point address in the first dimension, and an end point in the second dimension, and further wherein the coordinate generating provides condition data indicative of its current operating state, further including means for dividing the surface into subdivisions wherein the subdivisions are formed along one dimension of the visual display at points on the surface corresponding to the end point addresses in the other dimension of the visual display; and means coupled to the dividing means and to the coordinate data generating means for determining whether the end of a subdivision has been reached by the coordinate data generating means, and for storing the condition data from the coordinate data generating means whenever the end of a subdivision has been reached, whereby the condition data can be restored into the coordinate data generating means when the next subdivision is to be processed, so that the coordinate data generating means can resume processing where it left off.

13. A method for generating vectors for filling in a surface in a visual display of a type found in computer graphics systems wherein the surface is bounded by a plurality of line segments, each line segment being defined by line segment data, comprising the steps of a. generating coordinate data for each line segment, wherein the coordinate data define addresses which locate points that collectively form the line segments on the visual display, each point being located by a first address along a first dimension of the visual display and a second address along a second dimension of the visual display, the coordinate data including, for each point, the second address and a change-firstaddress signal, the change-first-address signal indicating whether the first address is to change from that of a previously defined point;

b. selecting coordinate data which include a change-first-address signal which requires a change in the first address;

c. recording the second addresses from the selected coordinate data to form a surface-fill table; and d. correlating all second addresses from the selected coordinate data which correspond to the same first address, so that the correlated second addresses define end points of surface-fill vectors which can collectively fill-in the surface.

14. The method of claim 13 wherein step "a" includes the step of analyzing the line segment data in accordance with the Bresenhem algorithm.

15. The method of claim 14, wherein the line segment data are defined by end point addresses and further including the preliminary steps of e. dividing the surface into subdivisions are formed along one dimension of the visual display at points on the surface which correspond to the end point addresses for the line segments in the other dimension of the visual display; and f. analyzing the line segments by subdivision so that all line segments associated with a subdivision are analyzed, before the line segments associated with another subdivision are analyzed.

16. An improved computer graphics system of the type which includes a visual display, a control processing unit, and means for generating vectors in the visual display wherein an image can be formed on a visual display, the image having a surface which is bounded by a plurality of line segments, each line segment being defined by corresponding line segment data, the improvement comprising means responsive to the line segment data for generating coordinate data, the coordinate data defining addresses which locate points that collectively form the plurality of line segments on the visual display, wherein each point is located by a first address along a first dimension of the visual display and a second address along a second dimension of the visual display, and further wherein the coordinate data provide the second address and a change-first-address signal for each point, the change-first-address signal indicating whether the first address for a current point is to be changed from the first address of a previously defined point; and means responsive to the coordinate data for recording the first and second address of each point for which the associated change-first-address signal indicates an address change, whereby the recorded first and second addresses are fill-segment data which represent end points of a plurality of parallel vectors by which the surface of the visual image can be filled-in, wherein the correlated addressing can be supplied to the vector generating means whereby vectors having end points corresponding to the correlated addressing can be written in the visual display to fill in the surface.

* * * * *